US009853353B2

(12) United States Patent
Judd et al.

(10) Patent No.: US 9,853,353 B2
(45) Date of Patent: Dec. 26, 2017

(54) SPACE VEHICLE ELECTROMECHANICAL SYSTEM AND HELICAL ANTENNA WINDING FIXTURE

(71) Applicant: Los Alamos National Security, LLC, Los Alamos, NM (US)

(72) Inventors: Stephen Judd, Los Alamos, NM (US); Nicholas Dallmann, Los Alamos, NM (US); David Guenther, Los Alamos, NM (US); Donald Enemark, Los Alamos, NM (US); Daniel Seitz, Los Alamos, NM (US); John Martinez, Los Alamos, NM (US); Steven Storms, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/745,763

(22) Filed: Jun. 22, 2015

(65) Prior Publication Data
US 2015/0372374 A1 Dec. 24, 2015

Related U.S. Application Data

(60) Provisional application No. 62/016,548, filed on Jun. 24, 2014, provisional application No. 62/016,566, filed on Jun. 24, 2014.

(51) Int. Cl.
| | |
|---|---|
| *H01Q 1/36* | (2006.01) |
| *H01Q 1/28* | (2006.01) |
| *H01Q 1/08* | (2006.01) |
| *H02S 30/20* | (2014.01) |
| *B64G 1/44* | (2006.01) |
| *B64G 1/22* | (2006.01) |
| *H01Q 21/28* | (2006.01) |

(52) U.S. Cl.
CPC ............ *H01Q 1/288* (2013.01); *B64G 1/222* (2013.01); *B64G 1/443* (2013.01); *H01Q 1/08* (2013.01); *H01Q 1/084* (2013.01); *H01Q 1/362* (2013.01); *H01Q 21/28* (2013.01); *H02S 30/20* (2014.12)

(58) Field of Classification Search
CPC .......... H01Q 1/08; H01Q 1/288; H01Q 1/084; H01Q 21/28; H01Q 1/362; B64G 1/443; B64G 1/222; H02S 30/20
USPC ................................. 343/895, 793, 797, 881
See application file for complete search history.

(56) References Cited

U.S. PATENT DOCUMENTS

| | | | | |
|---|---|---|---|---|
| 3,913,109 A | * | 10/1975 | Owen .................... | H01Q 1/084 343/880 |
| 4,475,111 A | * | 10/1984 | Gittinger ............. | H01Q 11/086 343/881 |
| 4,508,404 A | | 4/1985 | Frawley | |

(Continued)

OTHER PUBLICATIONS

Space Micro MSS-01,02 Medium Sun Sensors Brochure, http://www.spacemicro.com/assets/datasheets/guidance-and-nav/MSS.pdf (May 2, 2014).

(Continued)

*Primary Examiner* — Trinh Dinh
(74) *Attorney, Agent, or Firm* — LeonardPatel PC

(57) ABSTRACT

A space vehicle electromechanical system may employ an architecture that enables convenient and practical testing, reset, and retesting of solar panel and antenna deployment on the ground. A helical antenna winding fixture may facilitate winding and binding of the helical antenna.

14 Claims, 38 Drawing Sheets

(56) References Cited

U.S. PATENT DOCUMENTS

| | | | | |
|---|---|---|---|---|
| 4,780,727 A | * | 10/1988 | Seal | H01Q 11/086 343/880 |
| 5,040,748 A | | 8/1991 | Torre et al. | |
| 5,152,482 A | | 10/1992 | Perkins et al. | |
| 5,874,924 A | * | 2/1999 | Csongor | H01Q 1/288 343/789 |
| 5,986,619 A | * | 11/1999 | Grybos | H01Q 1/288 343/853 |
| 7,609,226 B1 | * | 10/2009 | MacGahan | H01Q 11/08 343/846 |
| 7,817,101 B2 | * | 10/2010 | Cowles | H01Q 1/08 343/895 |
| 8,730,124 B2 | * | 5/2014 | Behrens | B64G 1/222 343/895 |
| 8,970,447 B2 | * | 3/2015 | Ochoa | H01Q 1/288 343/880 |
| 9,067,695 B1 | * | 6/2015 | Suh | B64G 1/443 |
| 2006/0073723 A1 | | 4/2006 | Cowgill et al. | |
| 2010/0037932 A1 | * | 2/2010 | Erez | H01L 31/188 136/244 |
| 2012/0160294 A1 | * | 6/2012 | Phu | H01L 31/0508 136/244 |
| 2014/0253410 A1 | * | 9/2014 | DiNallo | H01Q 1/362 343/895 |

OTHER PUBLICATIONS

ESTCube-1 Wikipedia Page, https://en.wikipedia.org/wiki/ESTCube-1 (last accessed Apr. 24, 2014).

Justin M. Benedik, "Non-Final Office Action", dated May 18, 2017, for U.S. Appl. No. 14/746,046.

Restriction Requirement issued in U.S. Appl. No. 14/746,046 dated Feb. 14, 2017.

Justin M. Benedik, "Final Office Action", dated Sep. 26, 2017, U.S. Appl. No. 14/746,046.

\* cited by examiner

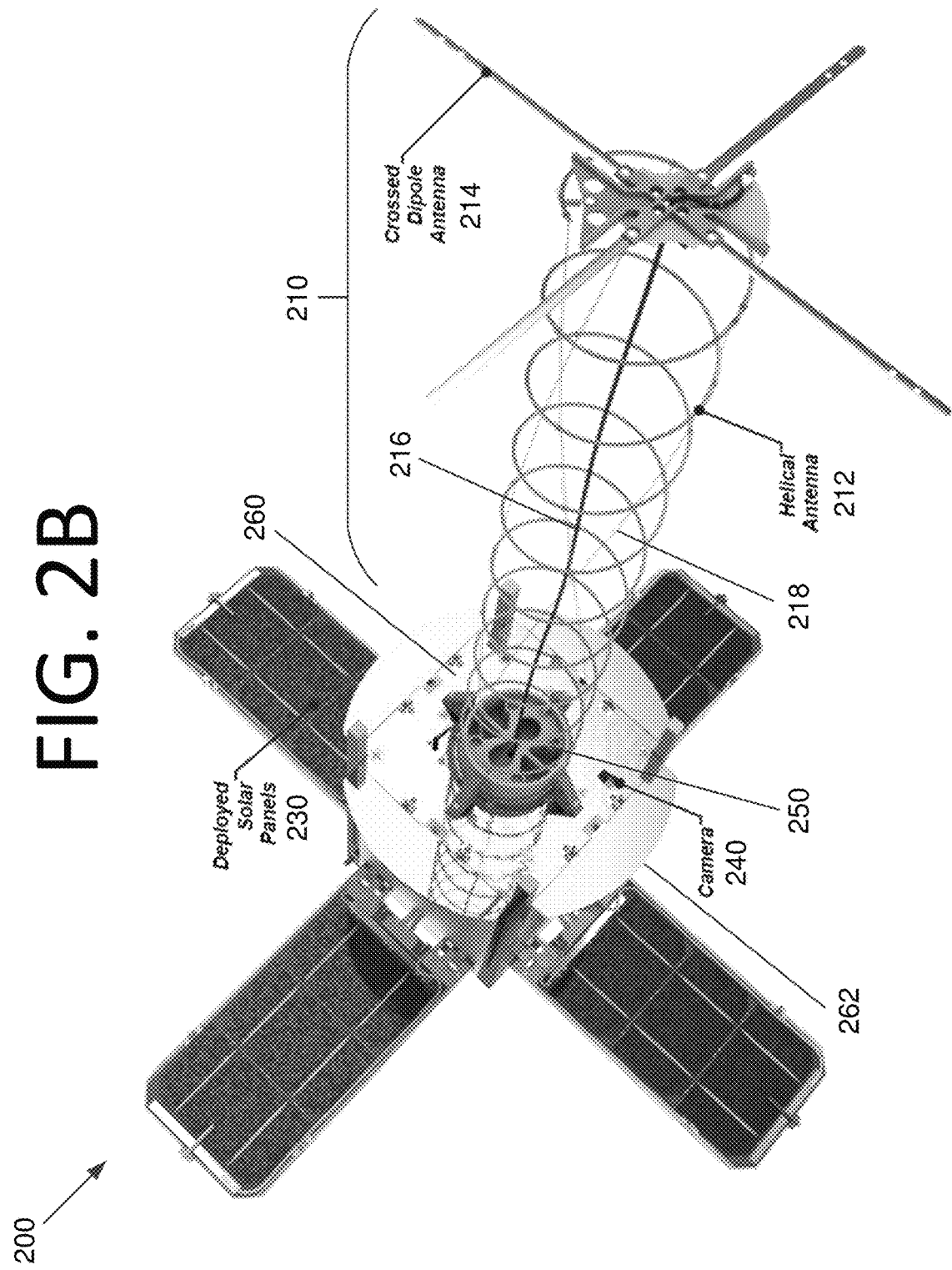

FIG. 6
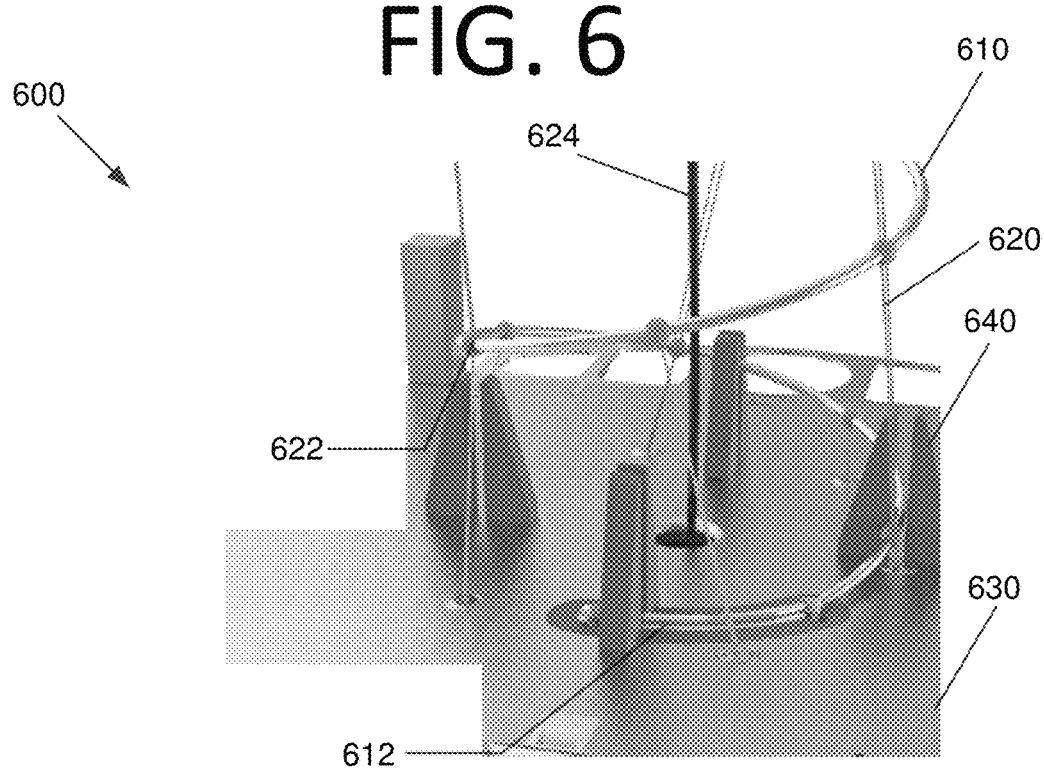
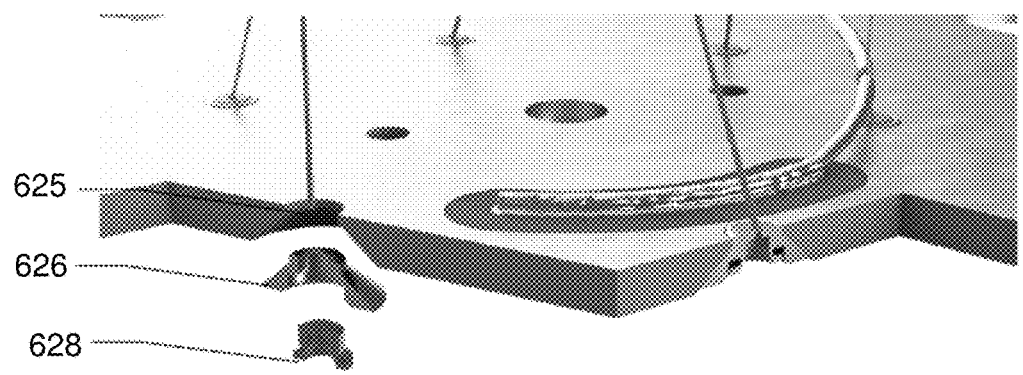

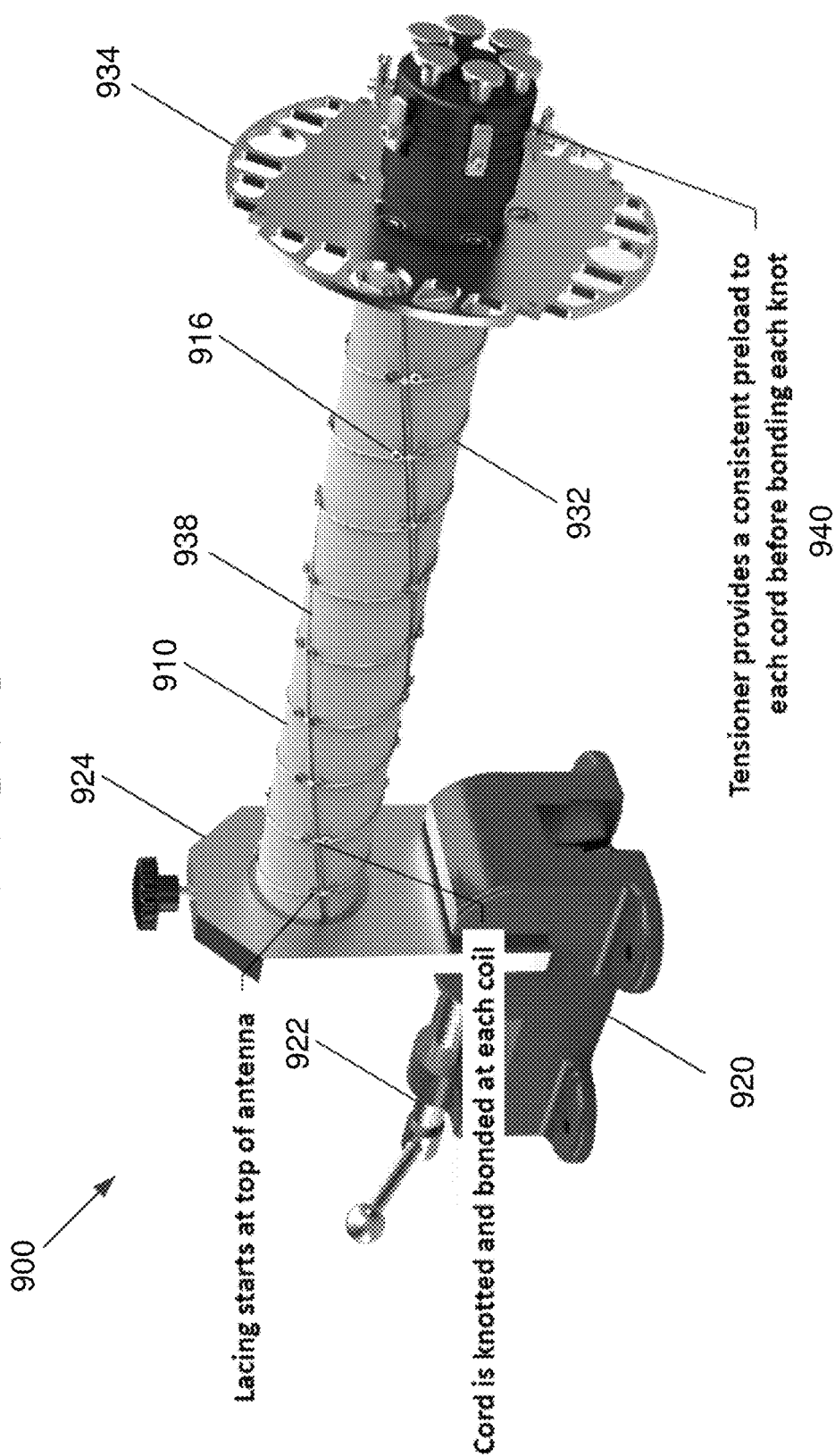

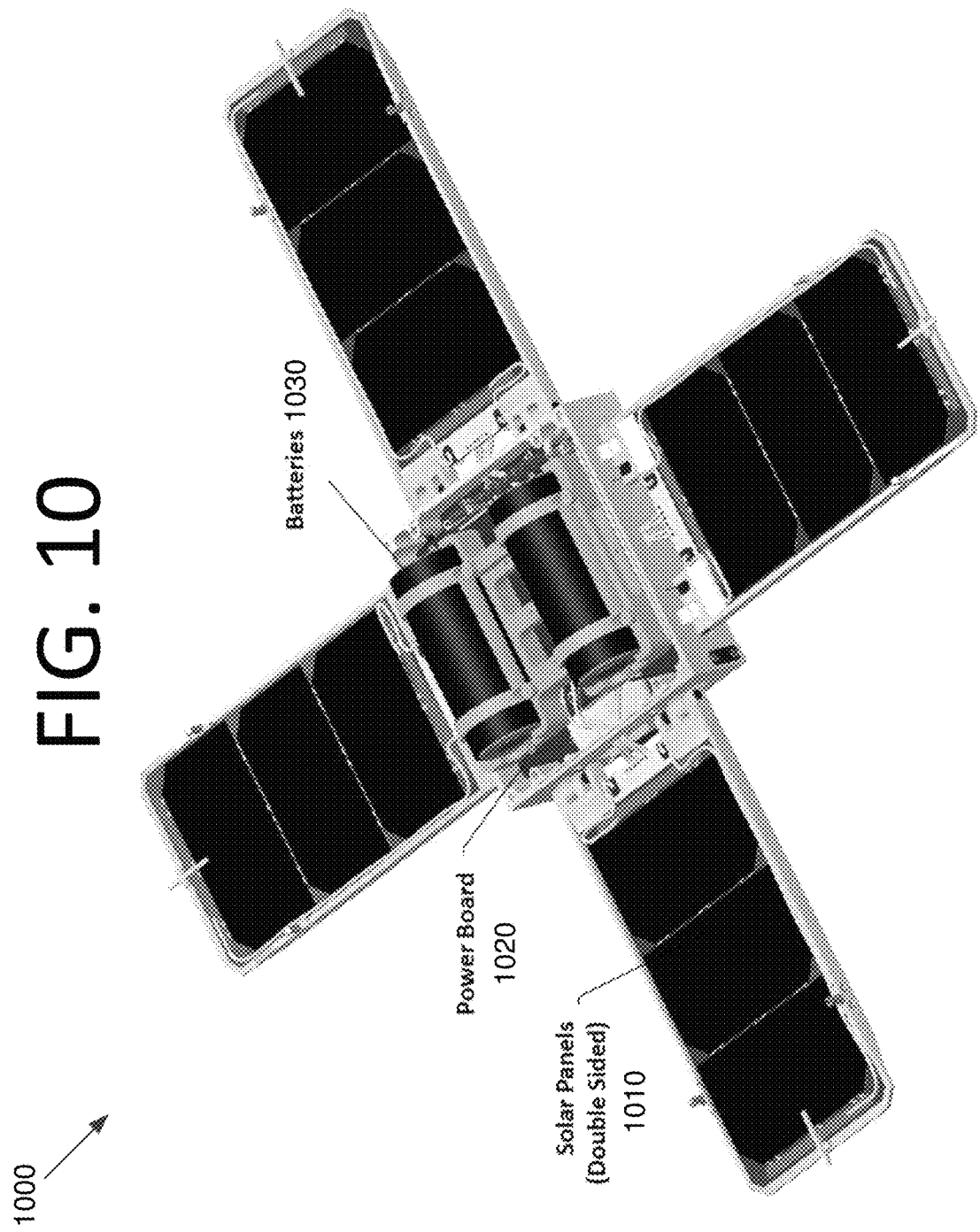

1300

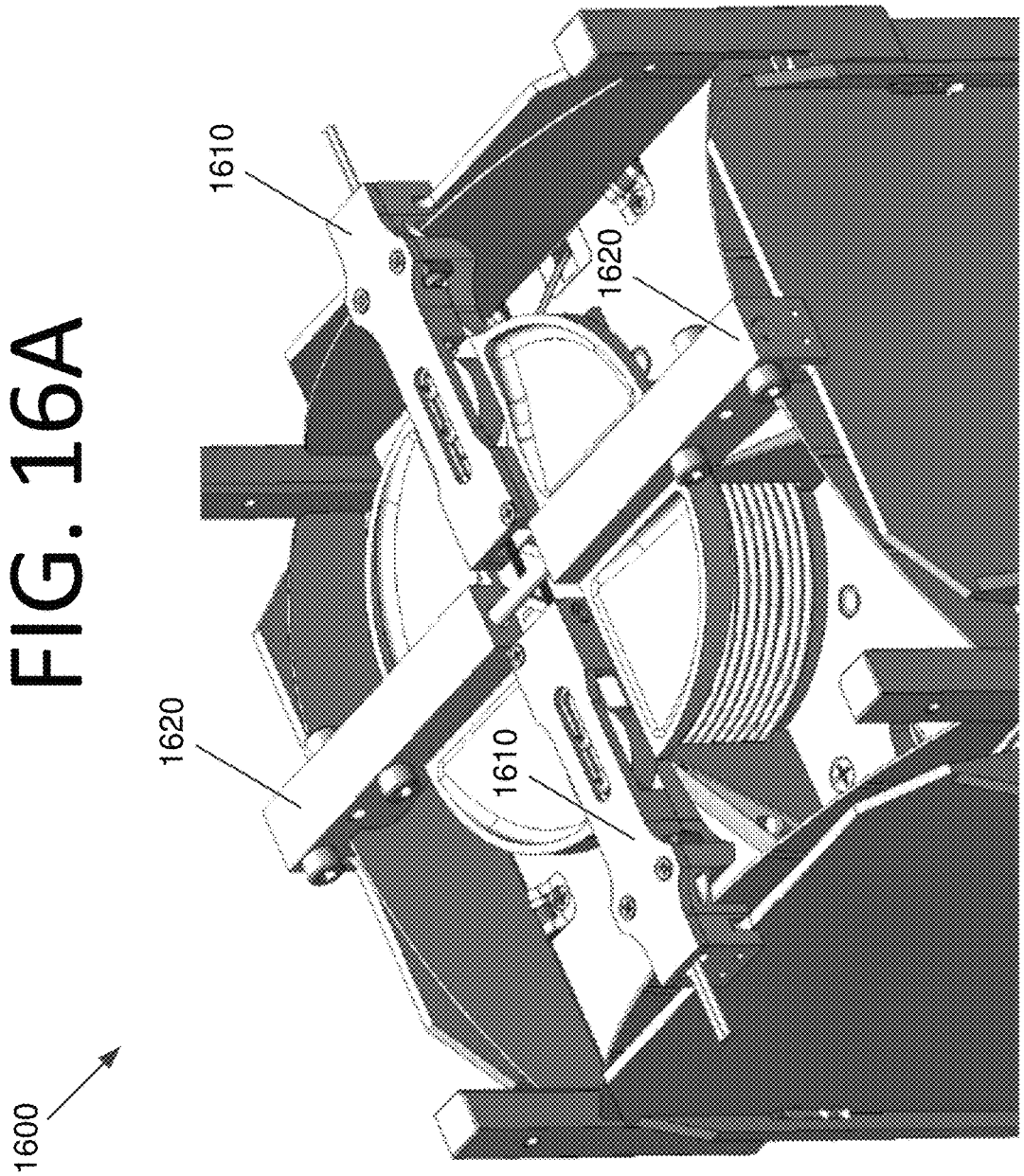

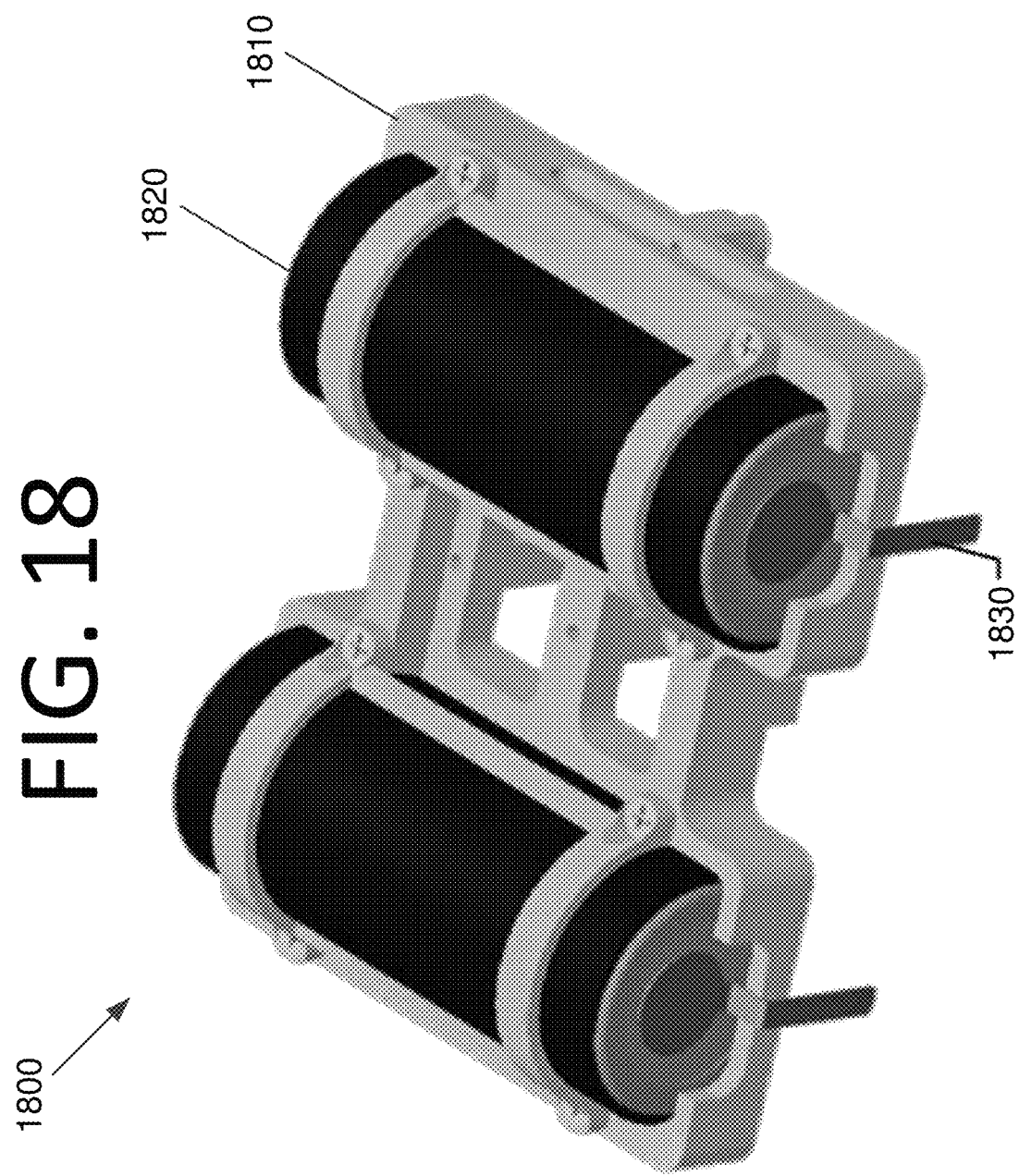

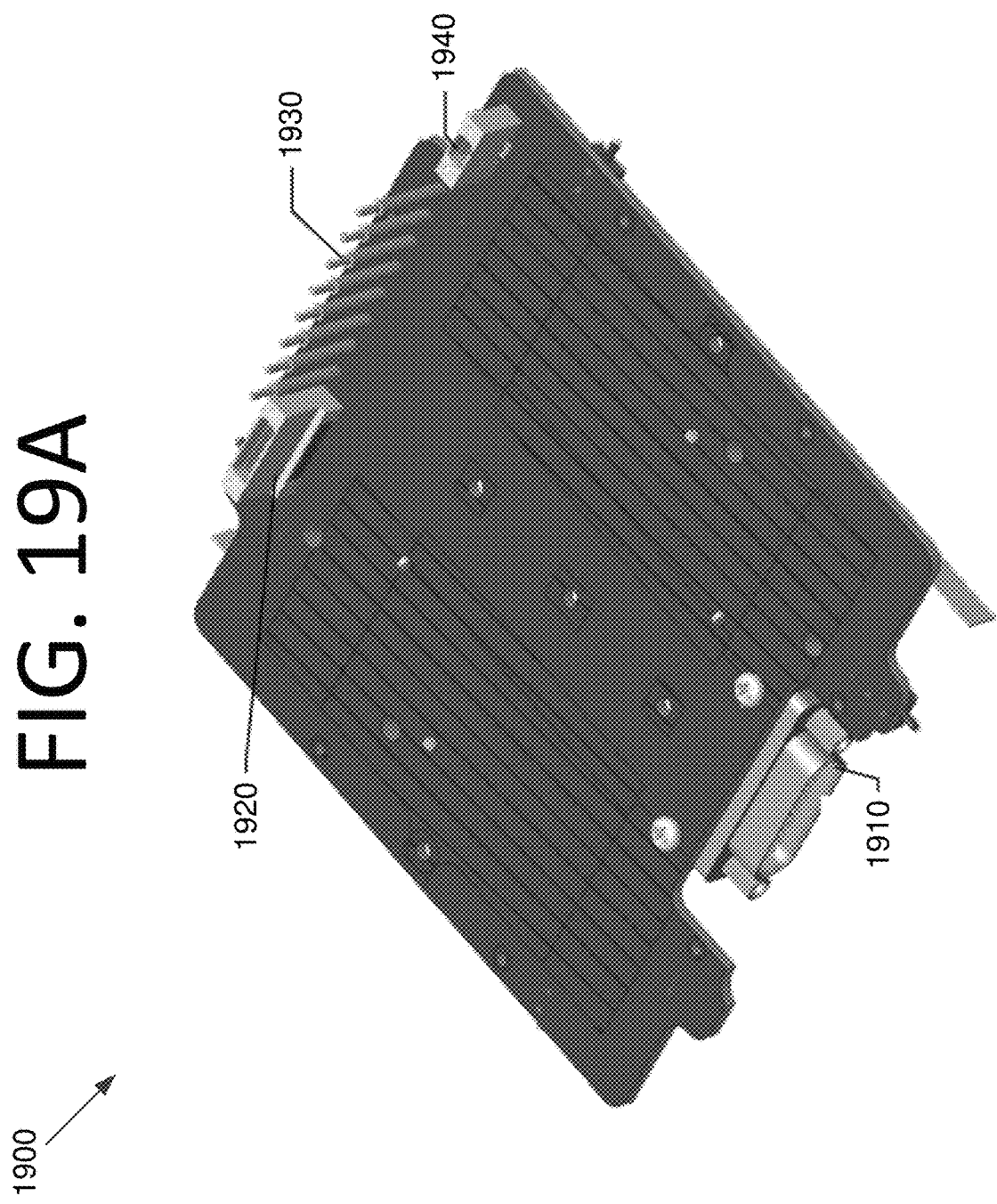

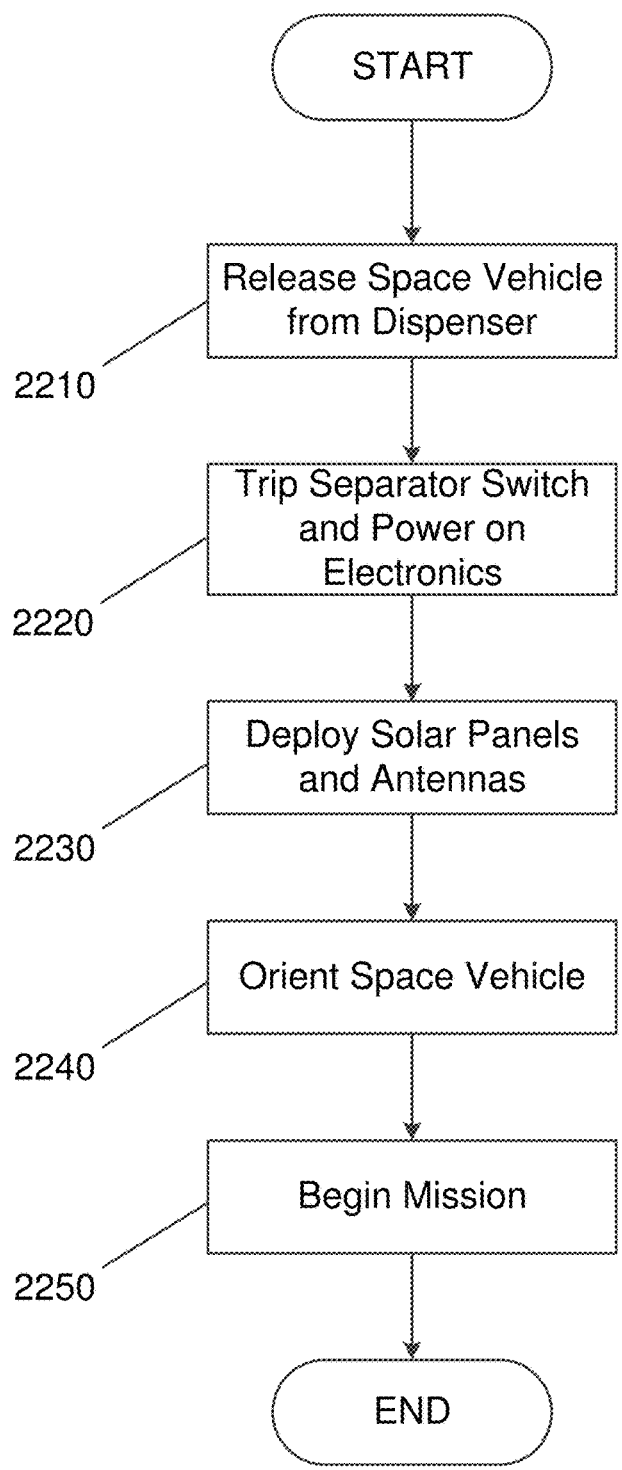

SPACE VEHICLE ELECTROMECHANICAL SYSTEM AND HELICAL ANTENNA WINDING FIXTURE

CROSS REFERENCE TO RELATED APPLICATIONS

This application claims the benefit of U.S. provisional patent application Nos. 62/016,548 and 62/016,566, both filed on Jun. 24, 2014. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to space vehicles, and more particularly, to a space vehicle electromechanical system and helical antenna winding fixture.

BACKGROUND

In conventional space vehicles, the electromechanical system cannot be efficiently tested, reset, and tested again to ensure reliable and effective operation. Also, effectively deploying high gain antennas and solar panels in small space vehicles has not previously been possible in a reliable, low cost manner. Accordingly, an improved space vehicle electromechanical system that addresses these issues may be beneficial.

SUMMARY

Certain embodiments of the present invention may provide solutions to the problems and needs in the art that have not yet been fully identified, appreciated, or solved by conventional space vehicle electromechanical systems. For example, some embodiments of the present invention employ an electromechanical system architecture that enables convenient and practical testing, reset, and retesting of solar panel and antenna deployment on the ground.

In an embodiment, an apparatus includes a constrained, deployable helical antenna and a constrained, deployable dipole antenna attached to one end of the helical antenna. Upon deployment, the helical antenna uncoils and the dipole antenna opens.

In another embodiment, an apparatus includes a constrained, deployable helical antenna and a ground plane attached to an end of the helical antenna. The apparatus also includes a cable connecting the helical antenna to the ground plane and a coiling and uncoiling cup configured to stow the cable when the helical antenna is stowed.

In yet another embodiment, a space vehicle includes a plurality of constrained solar panels and a release mechanism located on a plurality of tip plates that attach to respective solar panels of the plurality of solar panels. When released, the release mechanism is configured to allow the solar panels to deploy using a single release point.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2B is a perspective view illustrating the cubesat in a deployed configuration, according to an embodiment of the present invention.

FIG. 6 illustrates a helical antenna ground plane printed circuit board (PCB) interface, according to an embodiment of the present invention.

FIG. 9B is a perspective view illustrating the helical antenna lacing fixture with an attached helical antenna, according to an embodiment of the present invention.

FIG. 10 illustrates a space vehicle power module, according to an embodiment of the present invention.

FIG. 16A is a perspective view illustrating a top of a space vehicle with a release mechanism in a stowed configuration, according to an embodiment of the present invention.

FIG. 18 is a perspective view illustrating a LiFePO$_4$ battery assembly, according to an embodiment of the present invention.

FIG. 19A is a perspective view illustrating the top of a power board, according to an embodiment of the present invention.

FIG. 22 is a flowchart illustrating a process for deploying a space vehicle, according to an embodiment of the present invention.

DETAILED DESCRIPTION OF THE EMBODIMENTS

Figure 1:
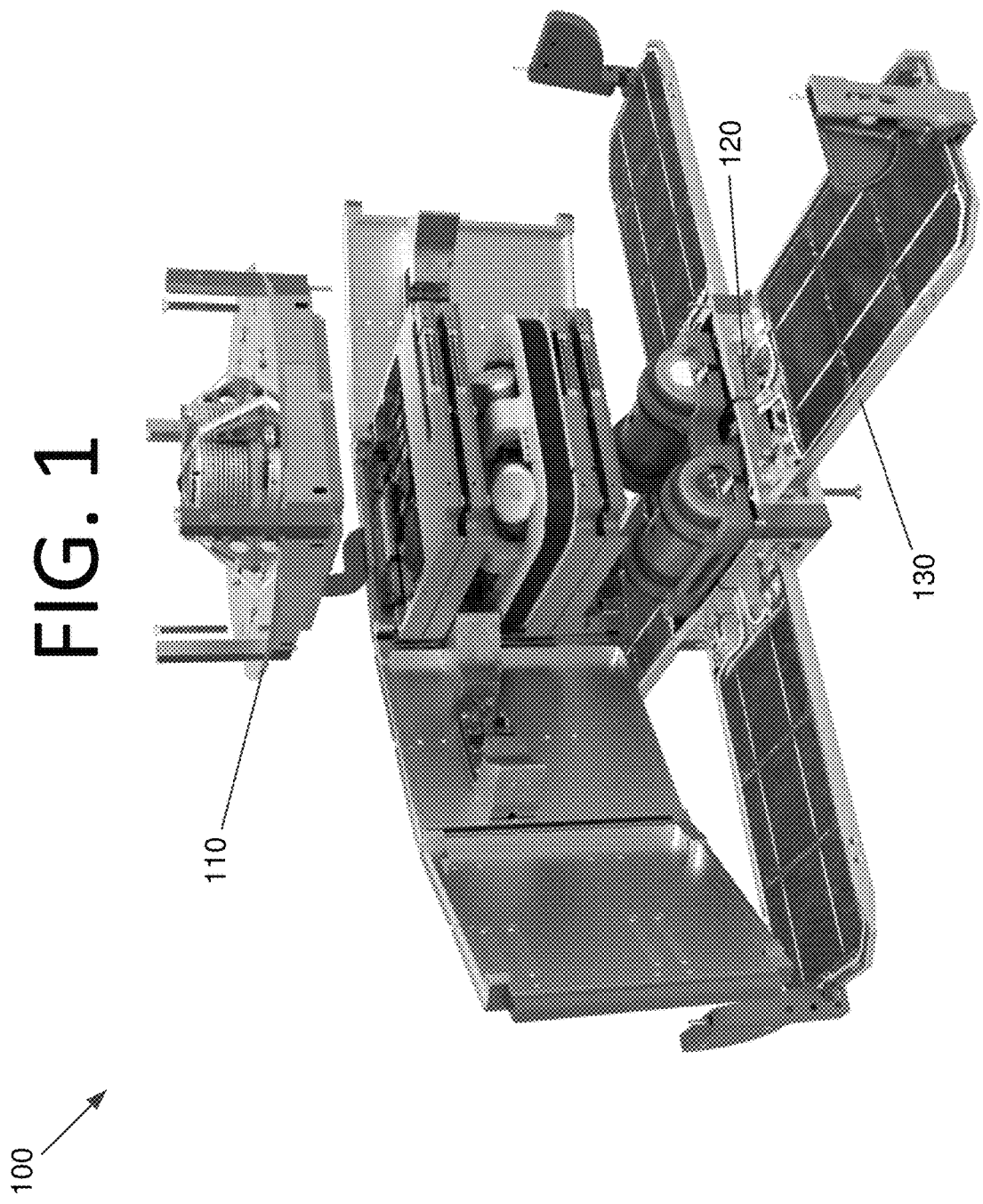
FIG. 1 illustrates an exploded perspective view illustrating a cubesat with an opened chassis, according to an embodiment of the present invention.

Some embodiments of the present invention pertain to deployable antennas and solar panels, modular power systems, dispensers, and deployment processes. FIG. 1 illustrates an exploded perspective view of a cubesat satellite 100 with an opened chassis, according to an embodiment of the present invention. In this embodiment, antennas, radio frequency (RF) equipment, and a housing 110 are located on top of cubesat 100. A power module 120 includes two batteries that store power and provide power to internal components of cubesat 100. Solar panels 130 convert solar energy into electricity, which is used to charge the batteries of power module 120.

Figure 2A:
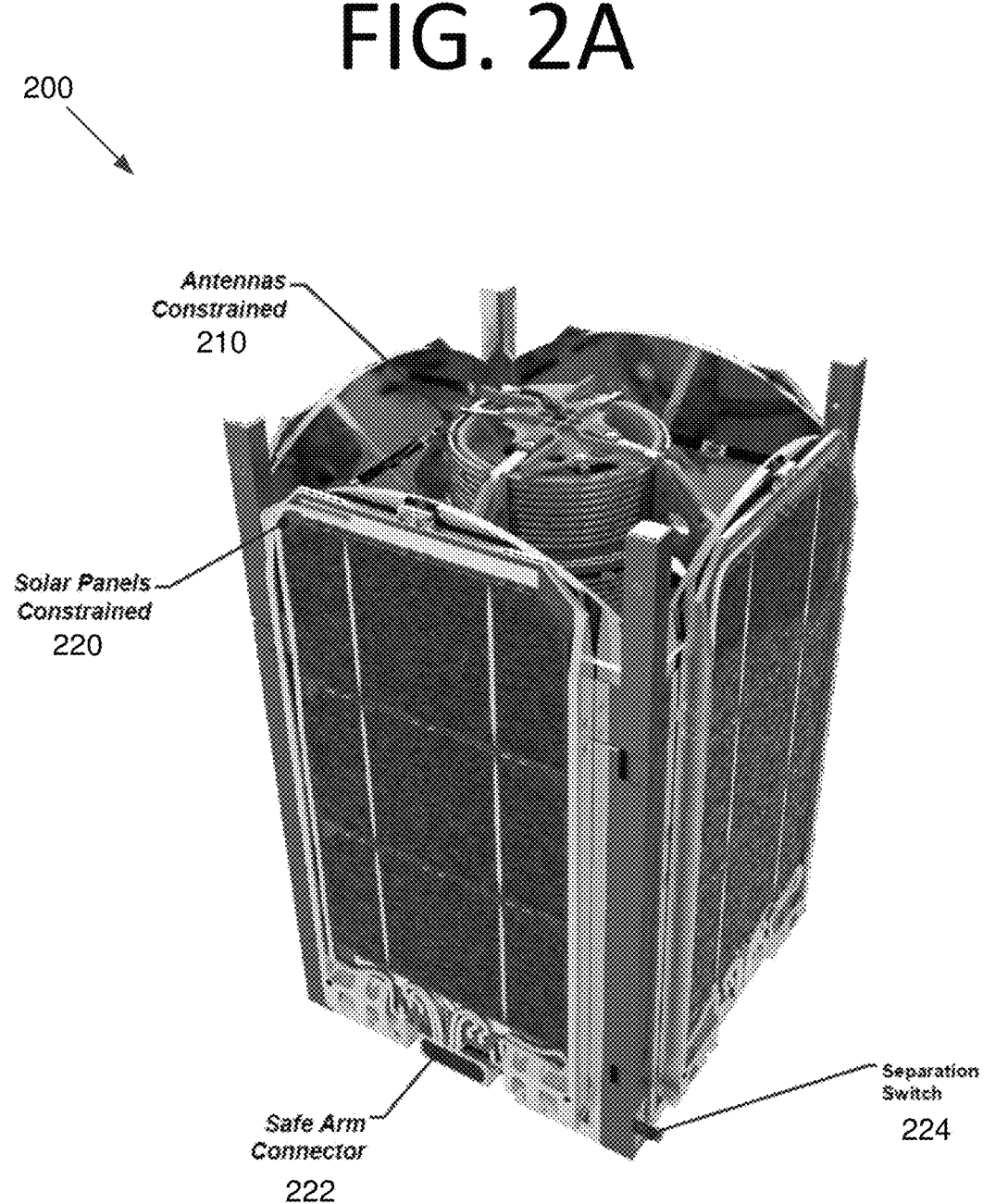
FIG. 2A is a perspective view illustrating a cubesat in a stowed configuration, according to an embodiment of the present invention.

FIG. 2A is a perspective view illustrating a cubesat satellite 200 in a stowed configuration, according to an embodiment of the present invention. Constrained helical and dipole antennas 210 are located on top of cubesat 200. The deployment of antennas 210 is discussed in further detail below.

Constrained solar panels 220 are stowed folded upwards on cubesat 200, forming a box shape. When deployed, solar panels 220 fold downward to form an "x" shape. See FIG. 2B. However, it should be appreciated that the chassis of the cubesat of other embodiments may have any desired shape, and any number and configuration of solar panels may be used. Furthermore, each solar panel may be configured to fold in any desired direction.

Whereas most cubesats use a remove-before-flight pin, a safe/arm connector 222 is used to disconnect the battery from the main space vehicle electronics in some embodiments, ensuring that the space vehicle is powered down while stored on the dispenser or while sitting in storage. Safe/arm connector 222 may also provide communications and diagnostics for the space vehicle, allowing the space vehicle to be programmed, configured, and tested while in the fully assembled flight configuration, as well as allowing the batteries to be charged. A rail separation switch 224 is triggered when cubesat 200 is released from a dispenser or other storage mechanism once reaching the desired release location. Rail separation switch 224 may be used to trigger various actions of the deployment process, converting cubesat 200 from the stowed configuration of FIG. 2A to the deployed configuration of FIG. 2B, for example. Furthermore, the battery or batteries may be disconnected by rail separation switch 224 until deployment, at which point the internal components of cubesat 200 power on. In some embodiments, connection of the battery may initiate a timer (e.g., 30 minutes) for releasing deployables, such as solar panels 220 and antennas 210.

FIG. 2B is a perspective view illustrating cubesat satellite 200 in a deployed configuration, according to an embodiment of the present invention. Antennas 210 extend vertically, uncompressing helical antenna 212 and unfolding crossed dipole antenna 214. Helical antenna 212 has relatively high gain for data uplink and a narrower beam width than crossed dipole antenna 214, which increases pointing accuracy. Crossed dipole antenna 214 has lower gain than helical antenna 212 and is omnidirectional. In other words, crossed dipole antenna 214 enables communication with cubesat 200 in any orientation. This generally cannot be achieved with high gain antenna 212 without much larger ground station antennas.

Conventionally, helical and dipole antennas are separate from one another, and the dipole antenna is proximate to the satellite chassis. Having the dipole antenna located relatively close to metal in the chassis reduces its capabilities. By attaching crossed dipole antenna 214 to the end of helical antenna 212, improved performance may be realized.

Solar panels 230 deploy into an "x" configuration in this embodiment. However, other shapes and configurations are envisioned within the scope of other embodiments. When power is low, or more efficient charging is otherwise desired, cubesat 200 may be positioned such that solar panels 230 face the sun. Positioning of cubesat 200 may be achieved by any desired means, such as wheels, movable masses, ion thrusters, rocket engines, any other suitable positioning system, or any combination thereof. A camera 240 provides imaging capabilities.

A coiling and uncoiling cup 250 enables stowing and uncoiling of an RF cable 216 quickly and reliably. The helix of helical antenna 212 centers around coiling and uncoiling cup 250, and an RF cable 216 passes through it. Coiling and uncoiling cup 250 may be fabricated using an additive manufacturing process, providing a lower cost part that generally cannot be built using normal machining processes. Coiling and uncoiling cup 250 provides a mechanism for stowing RF cable 216 before deployment, holding helical antenna 212 in place during mechanical vibration, ensuring a smooth release of helical antenna 212 without tangling supporting tethers 218, and ensuring a smooth release of RF cable 216 during deployment, preventing tangling of RF cable 216.

To improve the performance of helical antenna 212, a deployable ground plane 260 is used in this embodiment. Ground plane 260 is formed by the top of the structure and by four deployable panels (i.e., "flappers") 262 that give the circular shape to ground plane 260. Flappers 262 may be released using the same, single-point release mechanism. When deployed, ground plane 260 is full sized, providing optimal antenna performance in some embodiments.

Dispenser and Deployment

Figure 3:
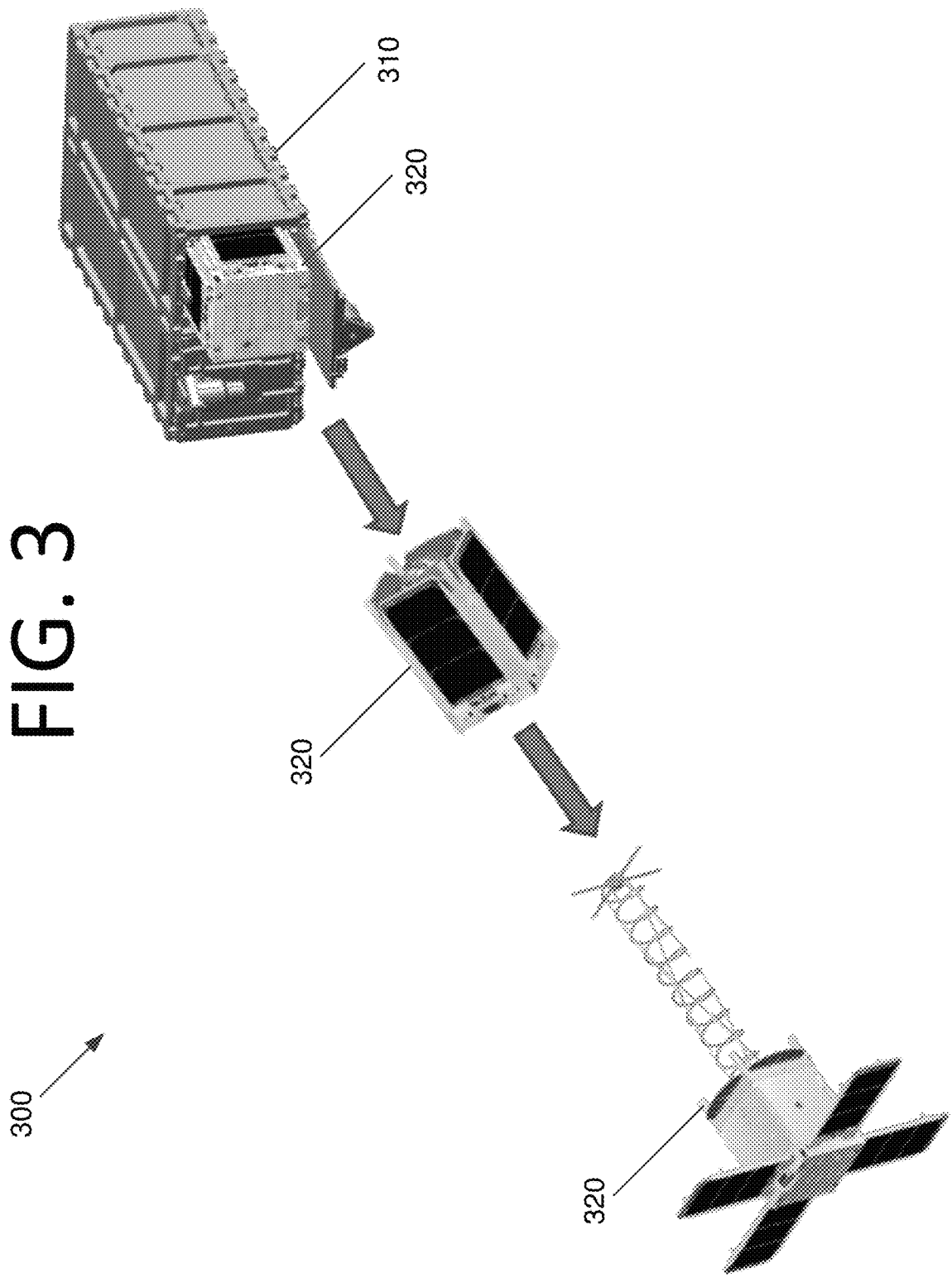
FIG. 3 is a perspective view illustrating a cubesat deployment process, according to an embodiment of the present invention.

FIG. 3 is a perspective view illustrating a cubesat deployment process 300, according to an embodiment of the present invention. Cubesat 320 is launched into space via a rocket or other space vehicle while stored in a dispenser 310. Dispenser 310 may house multiple satellites in some embodiments, and may be configured to release satellites at different points and/or in different directions.

Once released from dispenser 310, a timer starts for cubesat 320 to deploy. Once the timer expires, cubesat 320 deploys its solar panels and antennas. Cubesat 320 may then orient itself in a desired orientation and begin operation in accordance with its mission.

Antennas

Figure 4:
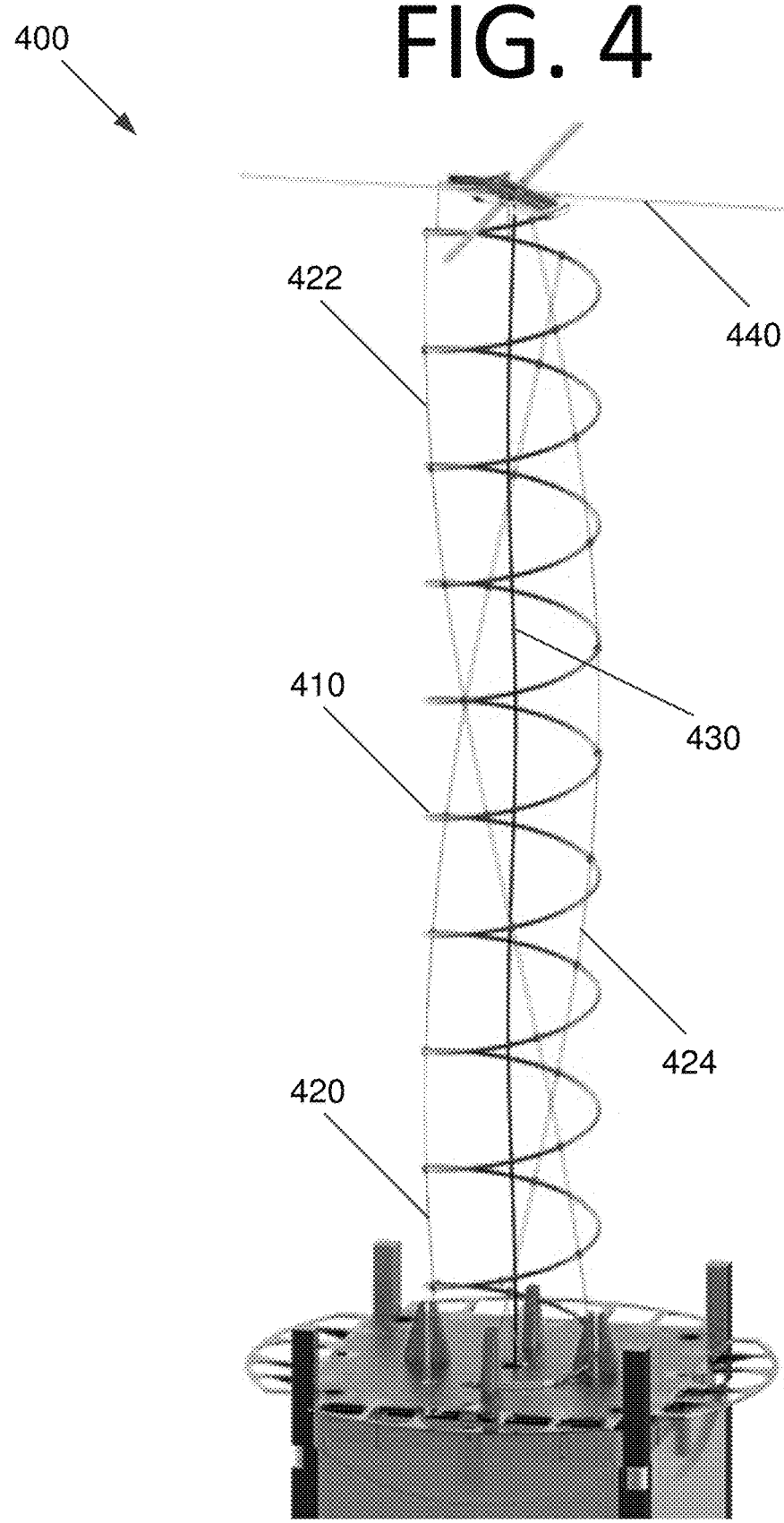
FIG. 4 is a vertically oriented side view of a helical antenna, according to an embodiment of the present invention.

FIG. 4 is a vertically oriented side view of a helical antenna 400, according to an embodiment of the present invention. Helical antenna 400 includes a coiled helix 410 that is held in place in a deployed state by three Kevlar™ threads 420, 422, 424. However, in other embodiments, other materials and/or numbers of threads may be used. Furthermore, in certain embodiments, the threads may have a different pattern, such as a mesh. Crossed dipole antenna 440 is located at the end of helical antenna 400, which reduces shadowing from a metal space vehicle body in some embodiments. A cable 430 provides a connection between the body of the space vehicle and crossed dipole antenna 440. An internal circuit board (not shown) may transmit and process data from crossed dipole antenna 440 and/or helical antenna 400.

Coiled helix 410 is a ten turn helix in this embodiment, with a pitch of 12.5° and an overall length of 13.08 inches. The circumference is 1.88 inches, which is $\lambda/\pi$ at two gigahertz (GHz). $\lambda$ represents the wavelength. In this embodiment, the circular polarization of helical antenna 400 is right handed. The half power beam width is 35° and the beam width at −1 dB is 10°. However, the number of turns, pitch, size, polarization direction, and beam width may be altered in other embodiments according to desired design parameters.

Figure 5:
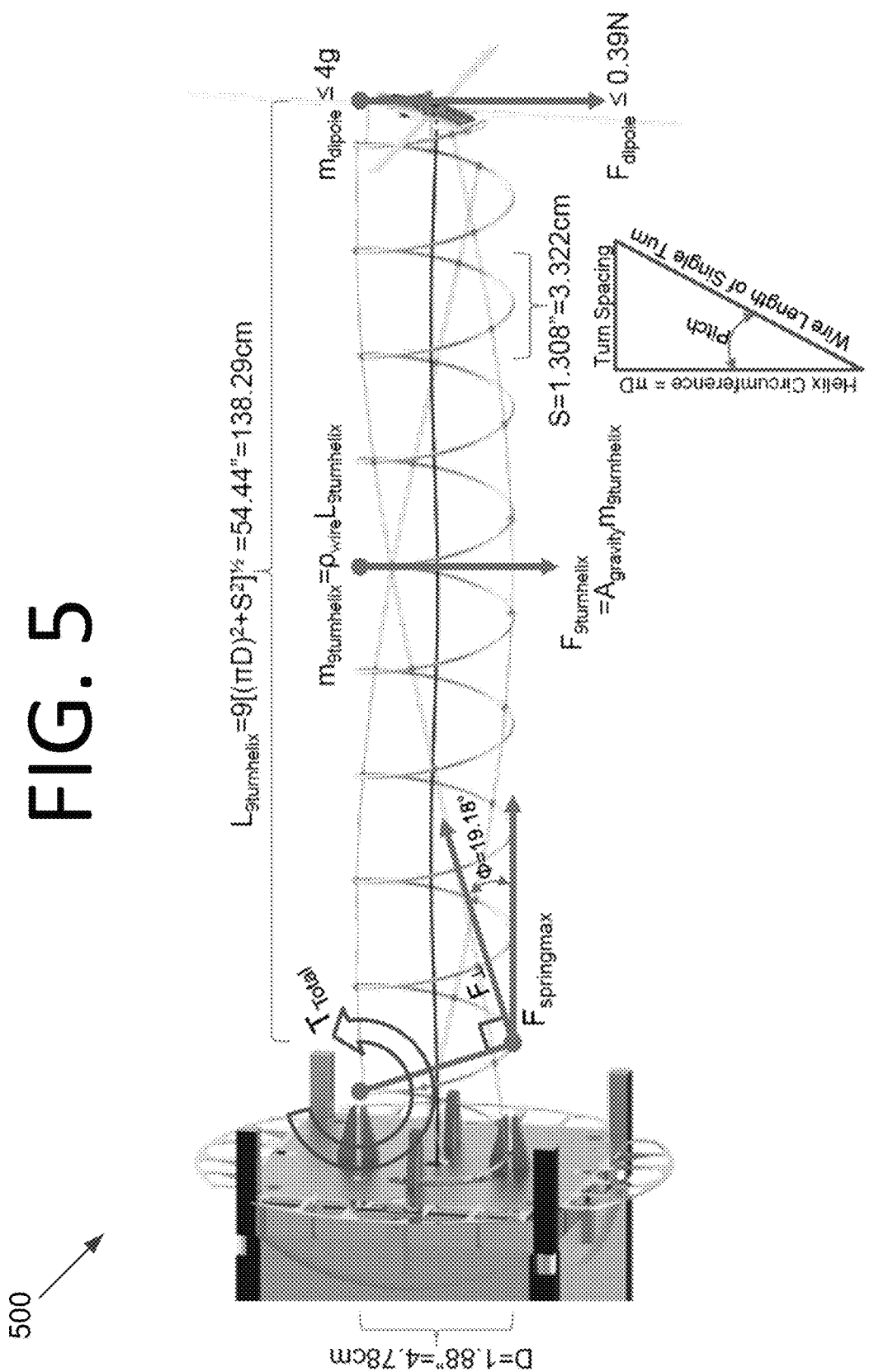
FIG. 5 is a side view illustrating deployed antennas with design parameters, according to an embodiment of the present invention.

FIG. 5 is a side view illustrating deployed antennas 500 with design parameters, according to an embodiment of the present invention. In some embodiments, a design goal is to have the helical antenna rigid when deployed horizontally in Earth's gravity. This may be accomplished by ensuring that the total torque ($T_{Total}$) is greater than zero. The first turn of the helix generally requires the most restoring torque. In some embodiments, the deployed antenna is almost completely rigid when horizontal right on the edge of the free length.

FIG. 6 illustrates a helical antenna and ground plane printed circuit board (PCB) interface 600, according to an embodiment of the present invention. In this embodiment, helical spring 610 is secured to ground plane PCB 630 by six double Teflon Kevlar™ cords 620. However, any number of cords may be used as a matter of design choice. Furthermore, the cords may be made from any suitable material that allows helical spring 610 to deploy but holds the antenna substantially rigid, such as certain plastics, carbon fiber, or wire made from metal that does not interfere with the operation of the antenna. Helical spring 610 is over-pitched to ensure that cords 620 are under tension when the antenna is deployed.

Cords 620 are attached to helical spring 610 via beads of glue 622 in this embodiment. However, any suitable connector may be used, such as plastic beads physically attached to both helical spring 610 and cords 620. Guides 640 attached to ground plane PCB 630 hold coils of helical spring 610 when it is stowed and assist with deployment of helical spring 610.

Cords 620 are secured to ground plane PCB 630 via anchors 628. Lacing from respective cords 620 is knotted, threaded through hole 625, and bonded into insert 626. Anchor 628 threads into insert 626.

Antenna feed structure 612 acts as both a mechanism to attach helical spring 610 to ground plane PCB 630 and an impedance matching circuit to match the antenna to a 50 ohm cable, for example. Antenna feed structure 612 may be a quarter-wave microstrip trace, and as such, may be simple, low cost, and enable a separate connection point for an RF cable 624. RF cable 624 is attached to ground plane PCB 630 using a connector (not shown), providing an external connector for radio and antenna testing while the space vehicle is in the fully assembled flight configuration.

Figure 7:
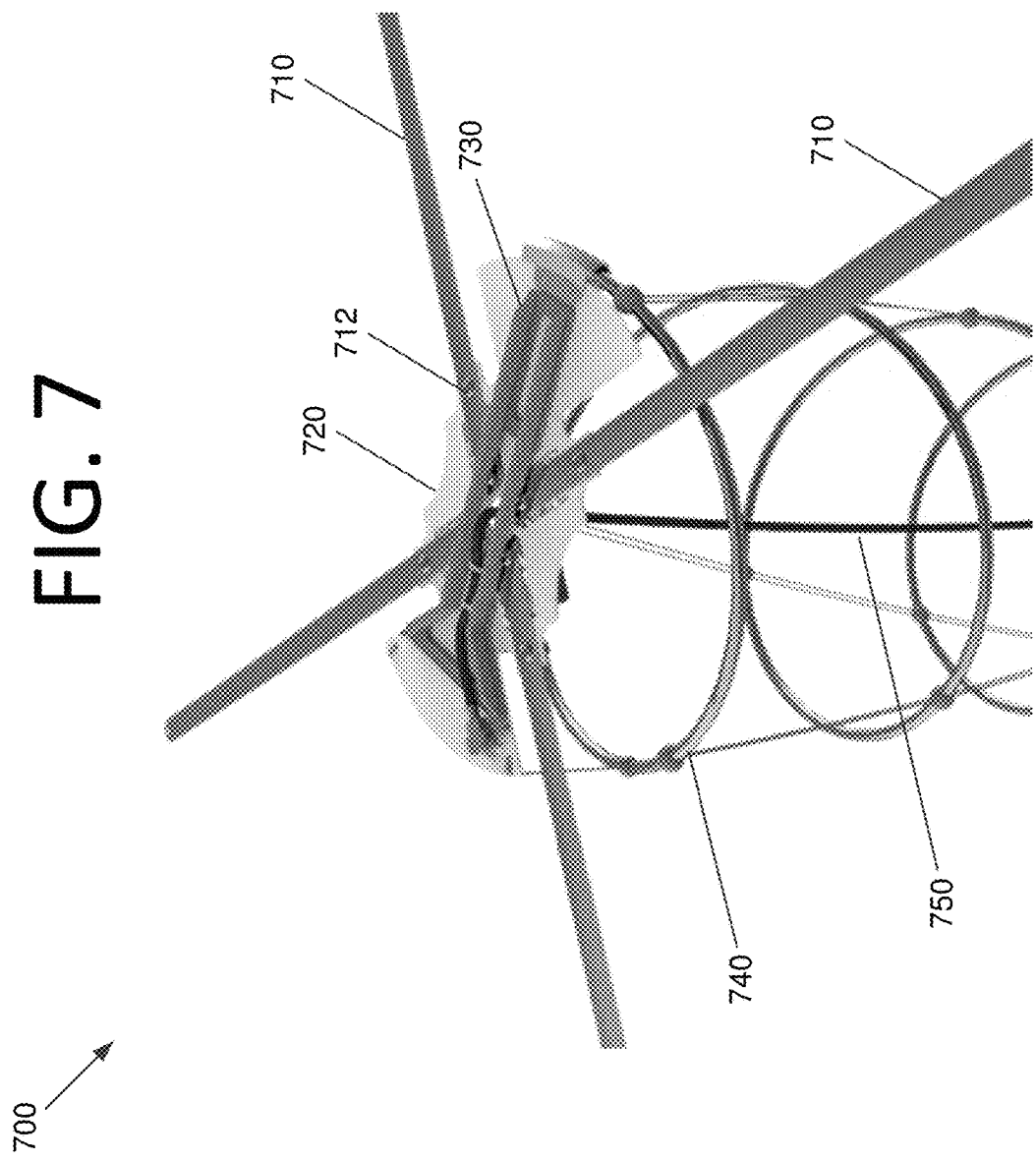
FIG. 7 is a perspective view illustrating a crossed dipole antenna, according to an embodiment of the present invention.
Figure 8:
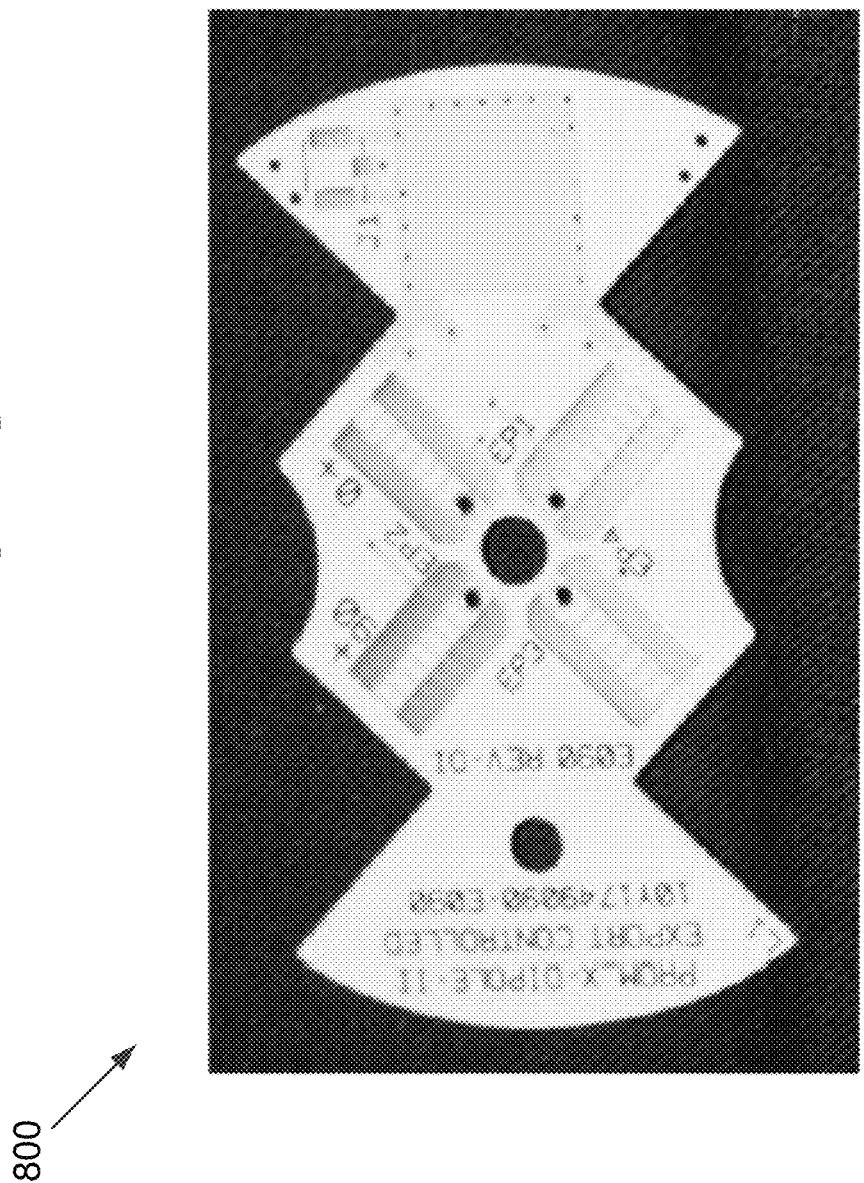
FIG. 8 is a perspective view illustrating a dipole interface PCB for a crossed dipole antenna, according to an embodiment of the present invention.

FIG. 7 is a perspective view illustrating a crossed dipole antenna 700, according to an embodiment of the present invention. A crossed dipole 710 is secured to a dipole interface PCB 720 via screws 712. A prototype of a dipole interface PCB 800 is shown in FIG. 8. Dipole interface PCB 720 is secured to helical spring 740 via brace 730, which holds crossed dipole antenna 700 in place at the end of helical spring 740. A cable 750 interfaces with dipole interface PCB 720 and provides data from dipole interface PCB 720 to internal electronics of the space vehicle. In this embodiment, crossed dipole antenna 700 has a gain centered at 915 MHz and is LHCP polarized. In some embodiments, to enable more efficient stowing of cable 750, a small diameter, flexible coaxial RF cable may be used, which generally has higher losses than larger diameter coaxial cables.

Helical Antenna Lacing Fixture

Figure 9A:
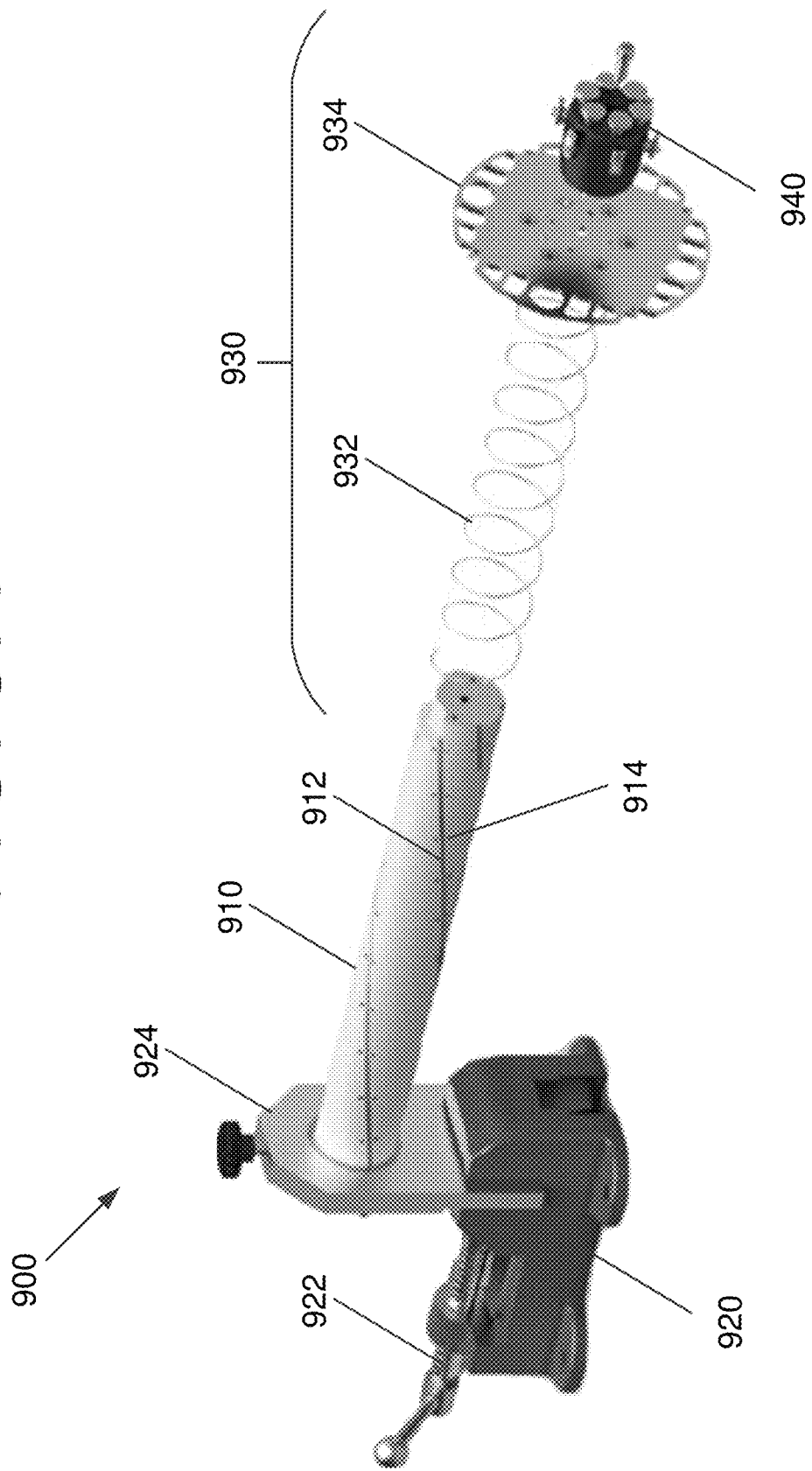
FIG. 9A is a perspective view illustrating a helical antenna lacing fixture with an unattached helical antenna, according to an embodiment of the present invention.

FIG. 9A is a perspective view illustrating a helical antenna lacing fixture 900 an unattached helical antenna 930, according to an embodiment of the present invention. Helical antenna lacing fixture 900 includes a rod 910 with a groove 912 to hold cords and holes 914 for screws 916 (see FIG. 10B) to hold helical wire 932 in place. A vertical plate 924 clamps onto and holds rod 910 in a horizontal position. However, in other embodiments, rod 910 may be positioned in other orientations. Vertical plate 924 fits into a base 920, which includes a screw 922 that clamps vertical plate 924 in place.

FIG. 9B is a perspective view illustrating helical antenna lacing fixture 900 with an attached helical antenna 930, according to an embodiment of the present invention. Helical spring 932 is held in place on rod 910 via screws 916, which are positioned so as to achieve the desired winding of helical spring 932. Lacing of cords 938 starts at the top of helical antenna 930, and cords 938 are knotted and bonded at each coil of helical spring 932. Ground plane PCB 934 is attached to the end of rod 910 via tensioner 940. Tensioner 940 also provides a constant preload to each cord 938 before bonding of each knot. Cords 938 are attached to ground plane PCB 934 in a similar manner to that shown in FIG. 6.

Power Module

FIG. 10 illustrates a space vehicle power module 1000, according to an embodiment of the present invention. Power module 1000 plugs into the main body of a space vehicle. This modular design simplifies building, testing, and assembly of power module 1000 and the remainder of the space vehicle.

Power module 1000 includes four double sided solar panels 1010 that convert solar energy into electricity. A power board 1020 interfaces with solar panels 1010 and batteries 1030, providing electricity to charge batteries 1030. Power board 1020 also channels power from batteries 1030 to other space vehicle components.

Figure 11A:
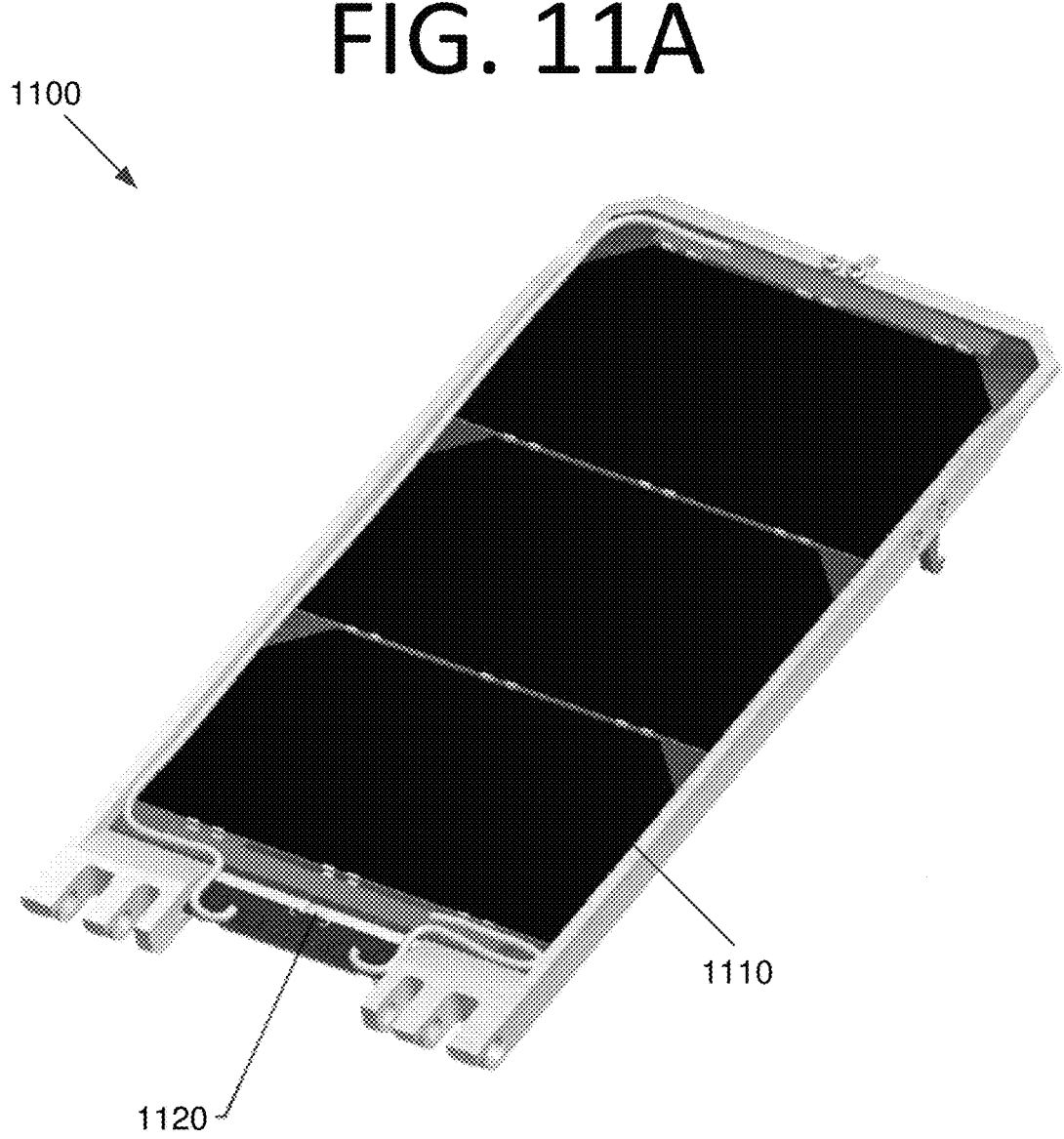
FIG. 11A is a perspective view illustrating the back of a solar panel, according to an embodiment of the present invention.

FIG. 11A is a perspective view illustrating the back of a solar panel 1100, according to an embodiment of the present invention. Photovoltaic solar cells 1110 convert solar energy into electricity. A thermistor (not shown) is embedded inside solar panel 1100 to permit maximum power point tracking. The thermistor connector exits at point 1120.

Figure 11B:
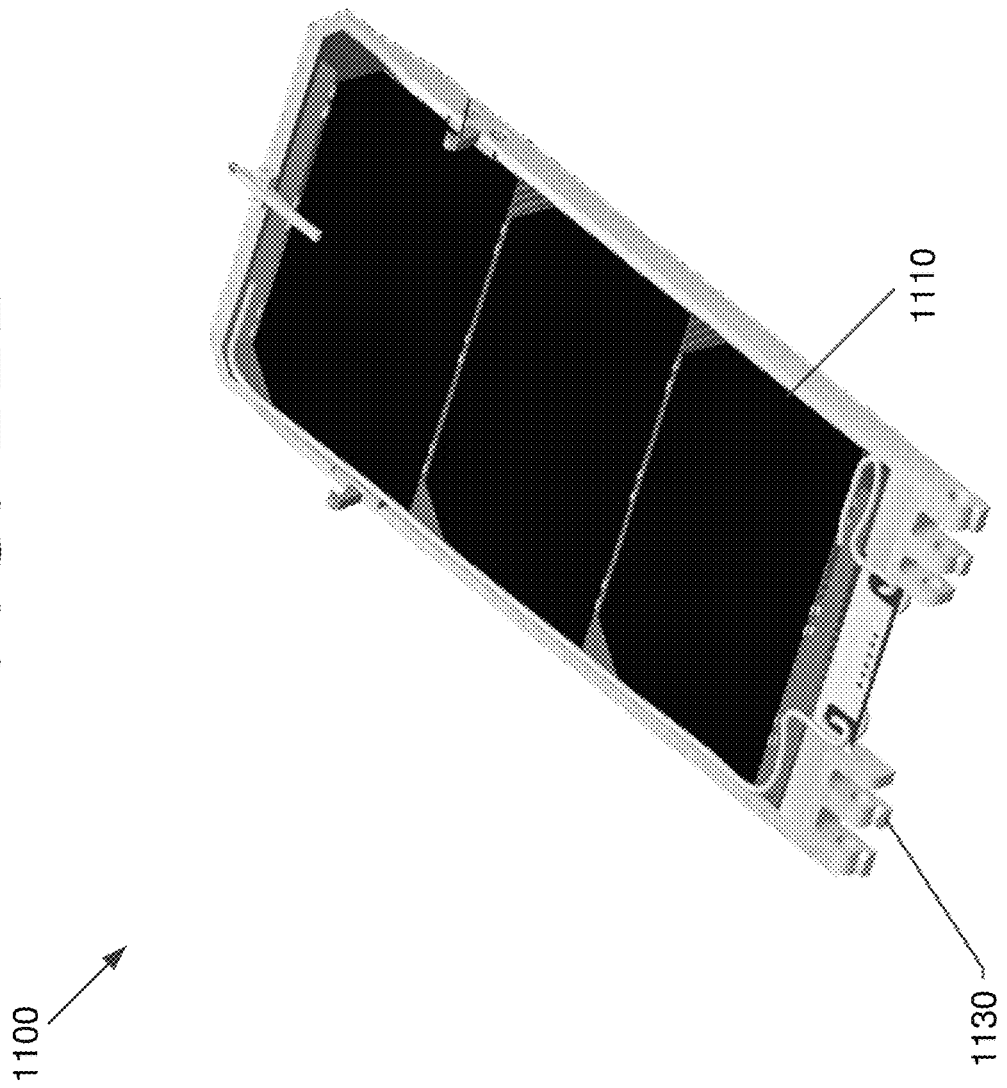
FIG. 11B is a perspective view illustrating the front of a solar panel, according to an embodiment of the present invention.

FIG. 11B is a perspective view illustrating the front of a solar panel 1100, according to an embodiment of the present invention. A hinge stop/indicator 1130 contacts a small switch in the space vehicle to indicate successful deployment.

Figure 12:
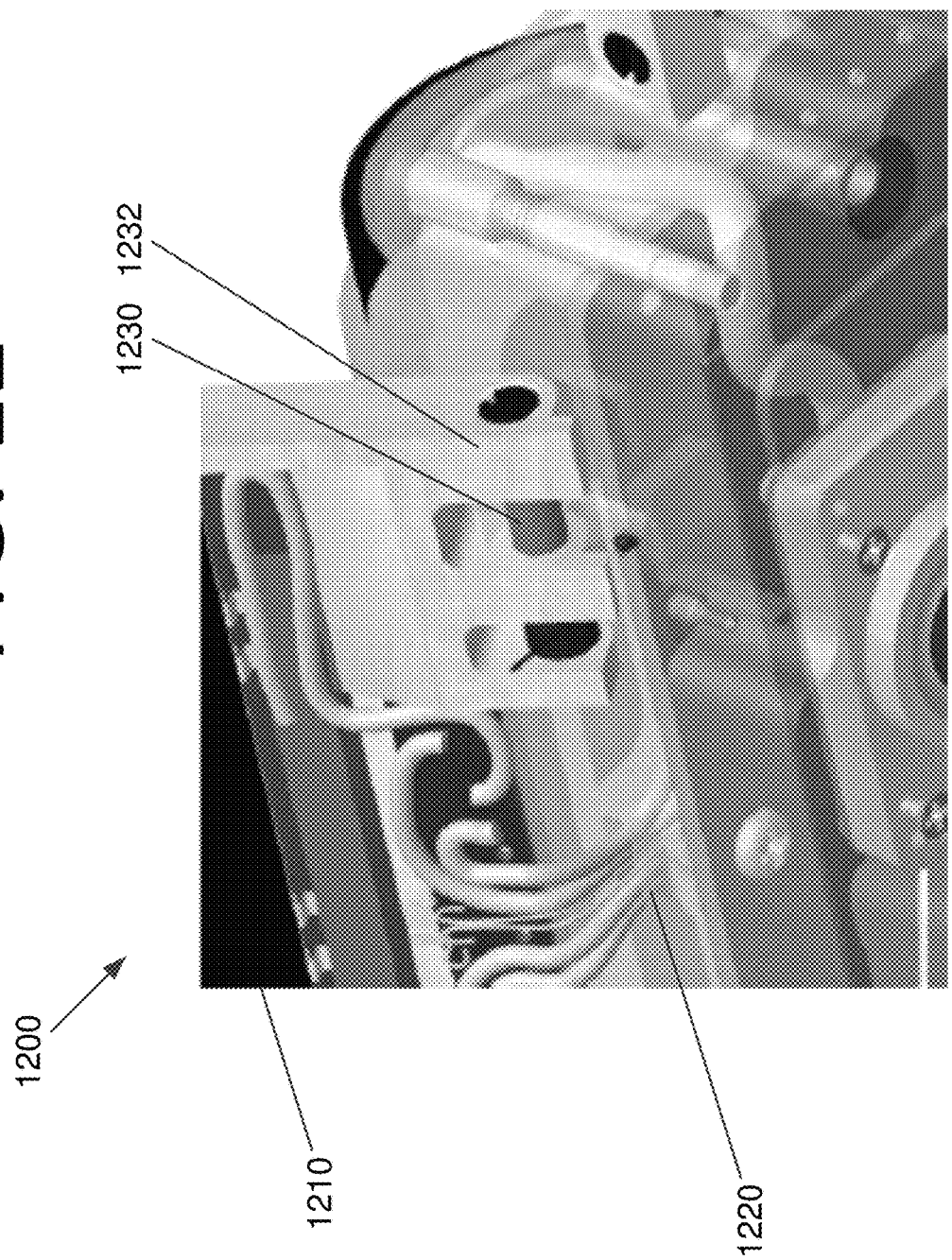
FIG. 12 is a perspective view illustrating the bottom of a power module, according to an embodiment of the present invention.

FIG. 12 is a perspective view illustrating the bottom of a power module 1200, according to an embodiment of the present invention. Maximum power point tracking thermistor connections 1220 from solar panel 1210 are connected to a thermistor (not shown) located inside the solar panel. A hinge stop/indicator 1230 is connected to the body of power module 1200 via a rod 1232 such that solar panel 1210 can pivot and deploy.

Figure 13:
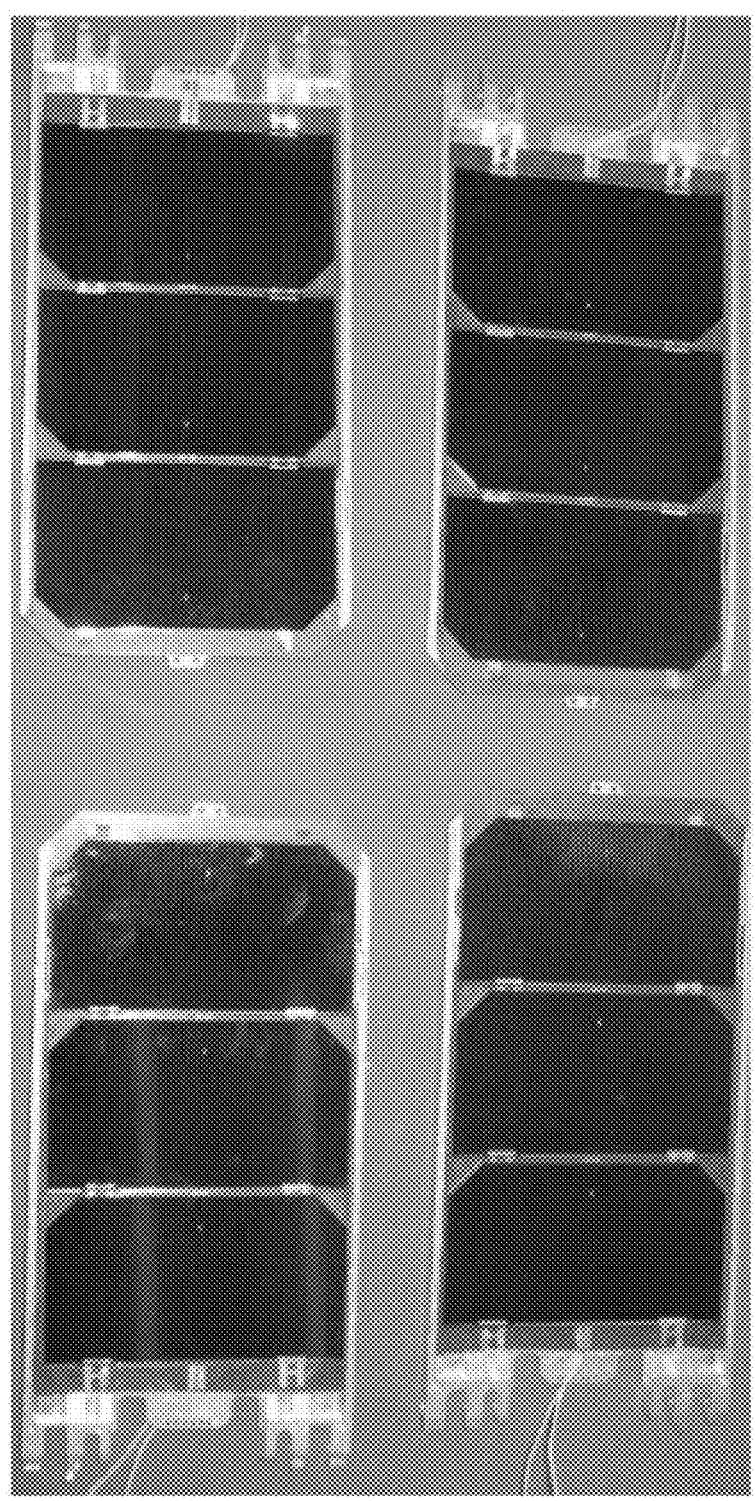
FIG. 13 is a top view illustrating four prototype solar panels, according to an embodiment of the present invention.

FIG. 13 is a top view illustrating four prototype solar panels 1300, according to an embodiment of the present invention. Thermal sensors (not shown) are bonded into all blank panels. A Kapton™ layer was added to solar panels 1300 for temperature stability in this embodiment.

Figure 14:
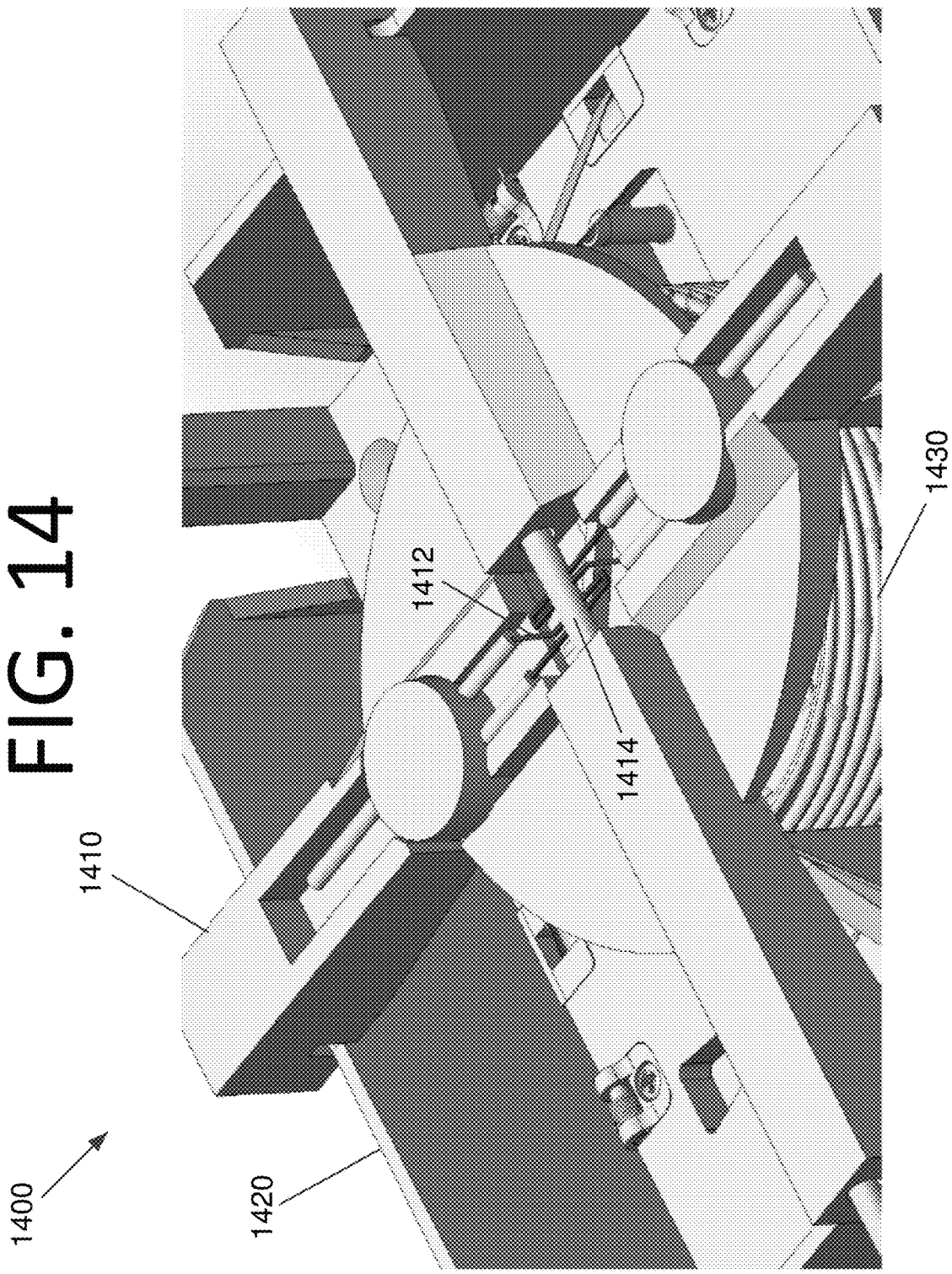
FIG. 14 is a perspective view illustrating a release mechanism, according to an embodiment of the present invention.

FIG. 14 is a perspective view illustrating a release mechanism 1400, according to an embodiment of the present invention. In some embodiments, release mechanism 1400 is constructed from aluminum and glass filled Noryl™. Release mechanism 1400 releases and deploys solar panels 1420 and antenna assembly 1430. Tip plates 1410 attach to solar panels 1420, holding solar panels 1420, ground plane extension flaps (not shown), and antenna assembly 1430 in place when they are stowed.

To deploy solar panels 1420 and antenna assembly 1430, cauterizer tips 1412 are heated to cut a nylon line 1414. The stowed force of antenna assembly 1430 deploys the antennas, solar panels 1420, and ground plane extension flappers (see element 222 in FIG. 2B, for example). Prior to launch, solar panels 1420, antenna assembly 1430, and release mechanism 1400 can quickly be reset, allowing for testing and retesting without disassembling the space vehicle.

The antennas may be designed such that RF signals are available for testing via an external connector (not shown) when the space vehicle is fully assembled. This enables testing of a space vehicle in a fully assembled configuration—for example to measure power output and frequencies, to validate radio functionality, and to validate antenna functionality. This is not present in conventional cubesat designs.

Figure 15A:
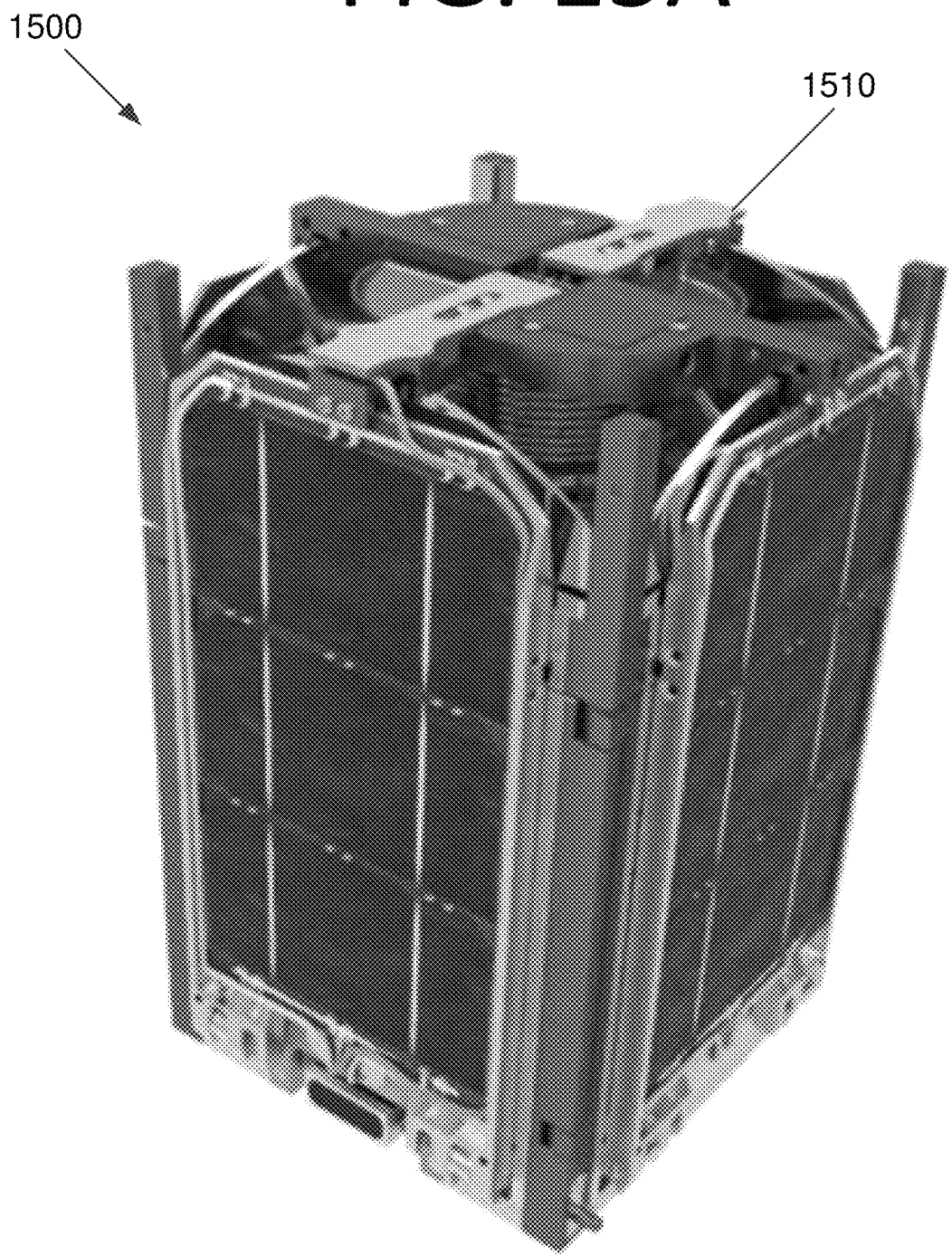
FIG. 15A is a perspective view illustrating a space vehicle in a stowed configuration, according to an embodiment of the present invention.
Figure 15B:
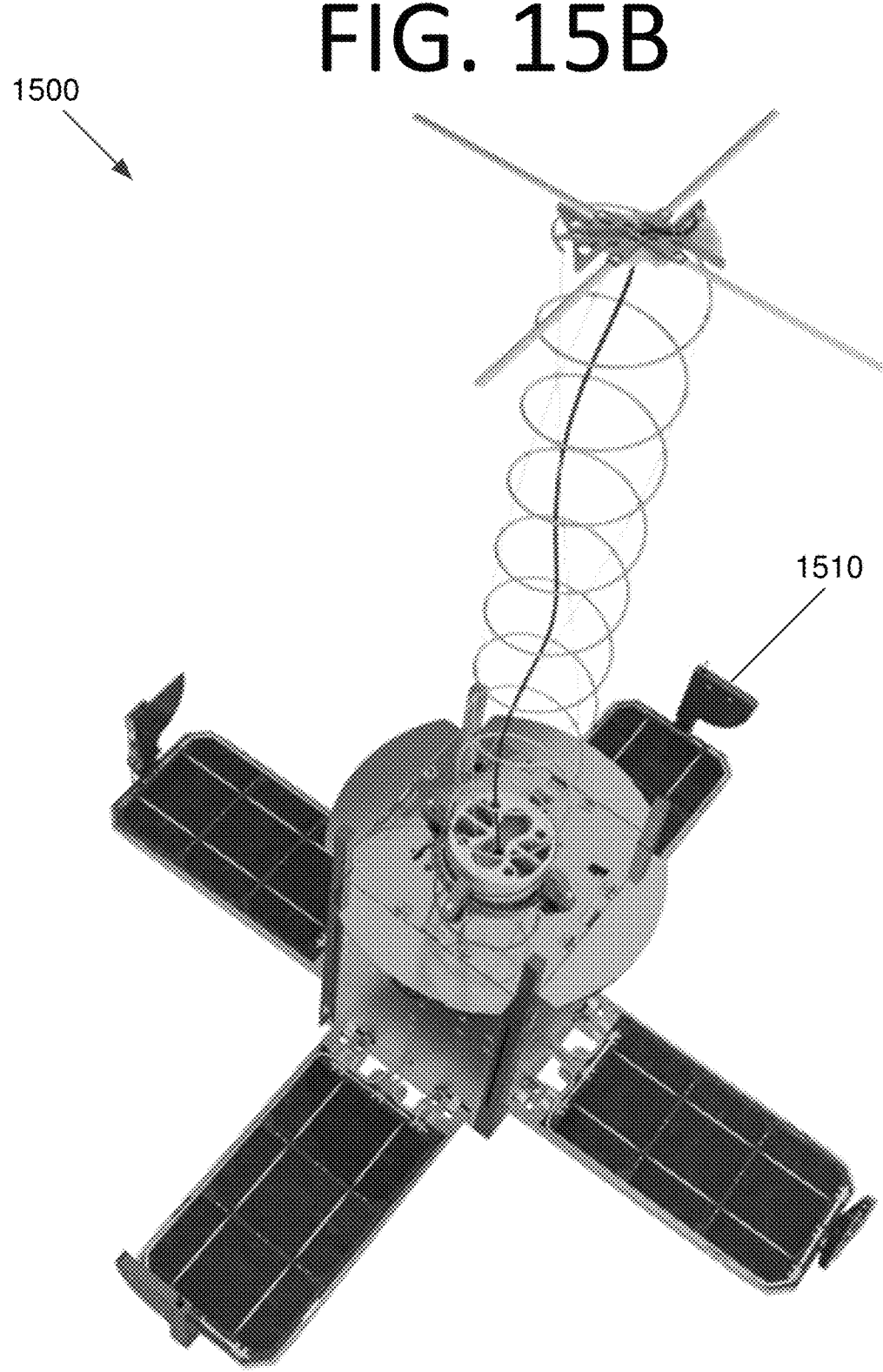
FIG. 15B is a perspective view illustrating the space vehicle in a deployed configuration, according to an embodiment of the present invention.

FIGS. 15A and 15B illustrate a space vehicle 1500 with tip plates 1510 in a stowed and deployed configuration, according to an embodiment of the present invention. Tip plates 1510 are attached to the solar panels and remain attached following deployment. Tip plates 1510 also contain electronics, such as a magnetometer, used by the ADCS.

FIG. 16A is a perspective view illustrating a top of a space vehicle with a release mechanism 1600 in a stowed configuration, according to an embodiment of the present invention. Release mechanism 1600 includes a pair of cauterizing arms 1610 configured to cut a nylon line and a pair of line holding arms 1620 configured to hold the nylon line in place until cut. Cauterizing arms 1610 and wire holding arms 1620 also hold the space vehicle in a stowed position until deployment.

Figure 16B:
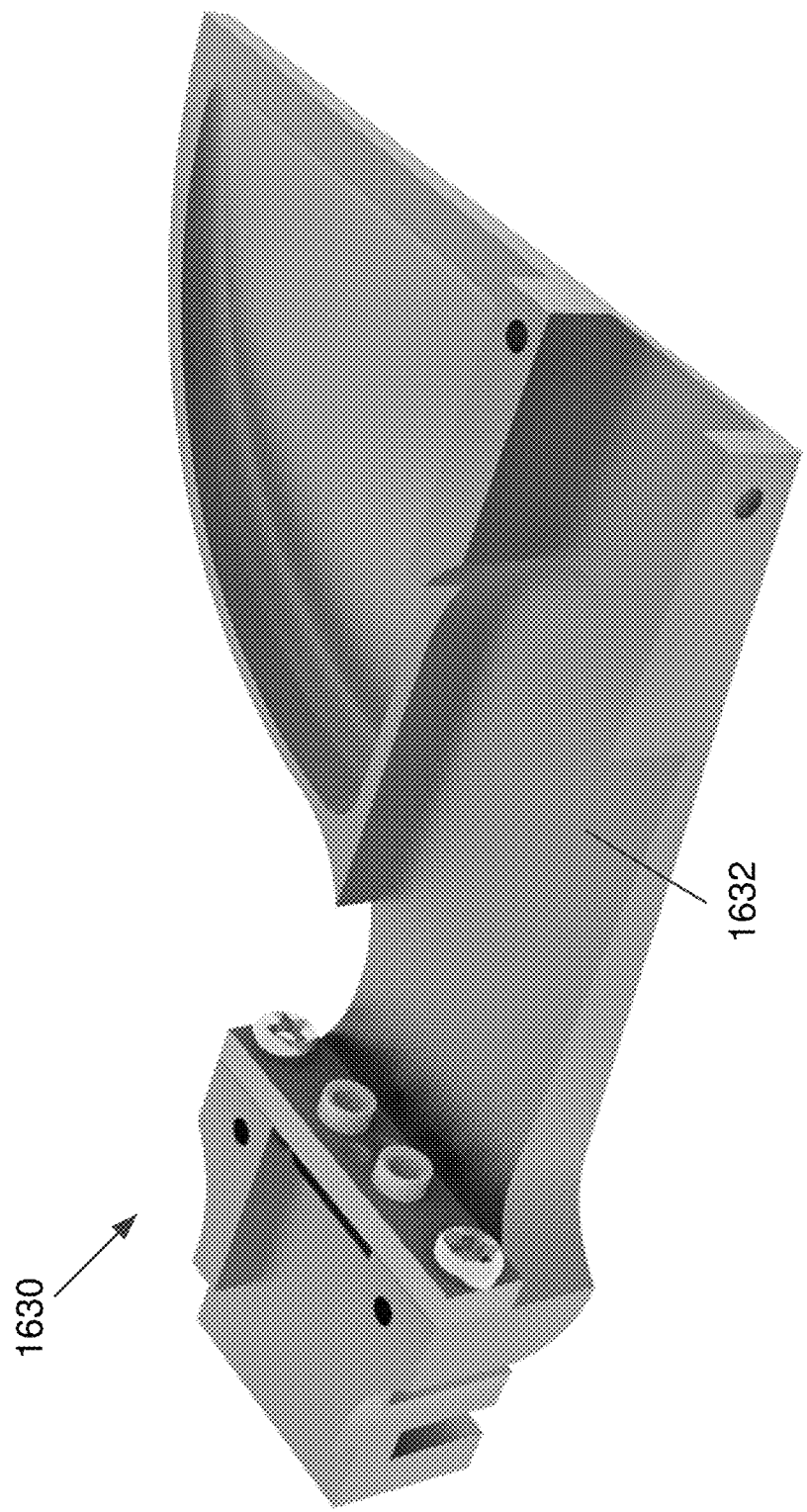
FIG. 16B is a perspective view illustrating a bottom plate of a cauterizing arm, according to an embodiment of the present invention.
Figure 16C:
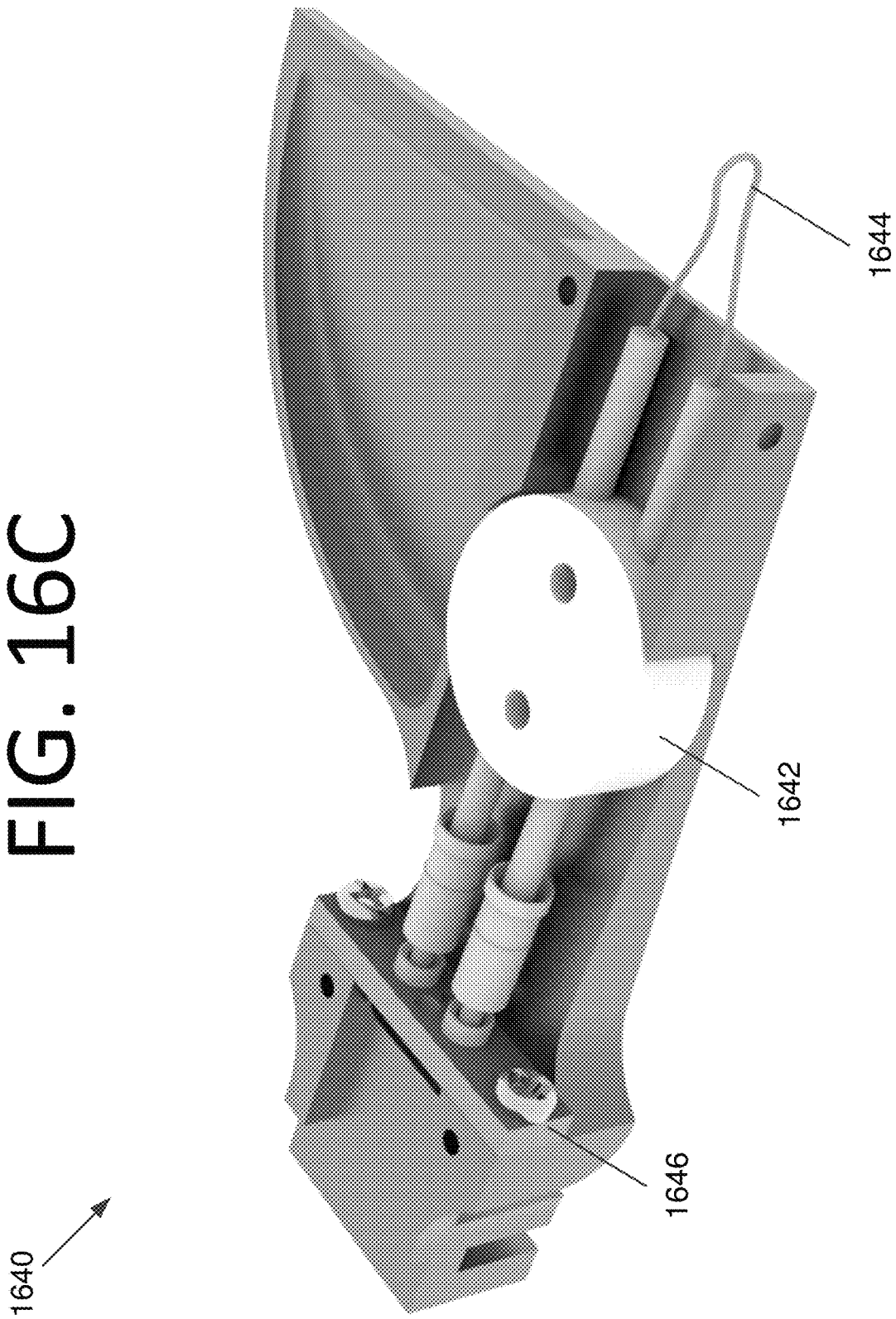
FIG. 16C is a perspective view illustrating a cauterizer of the cauterizing arm, according to an embodiment of the present invention.
Figure 16D:
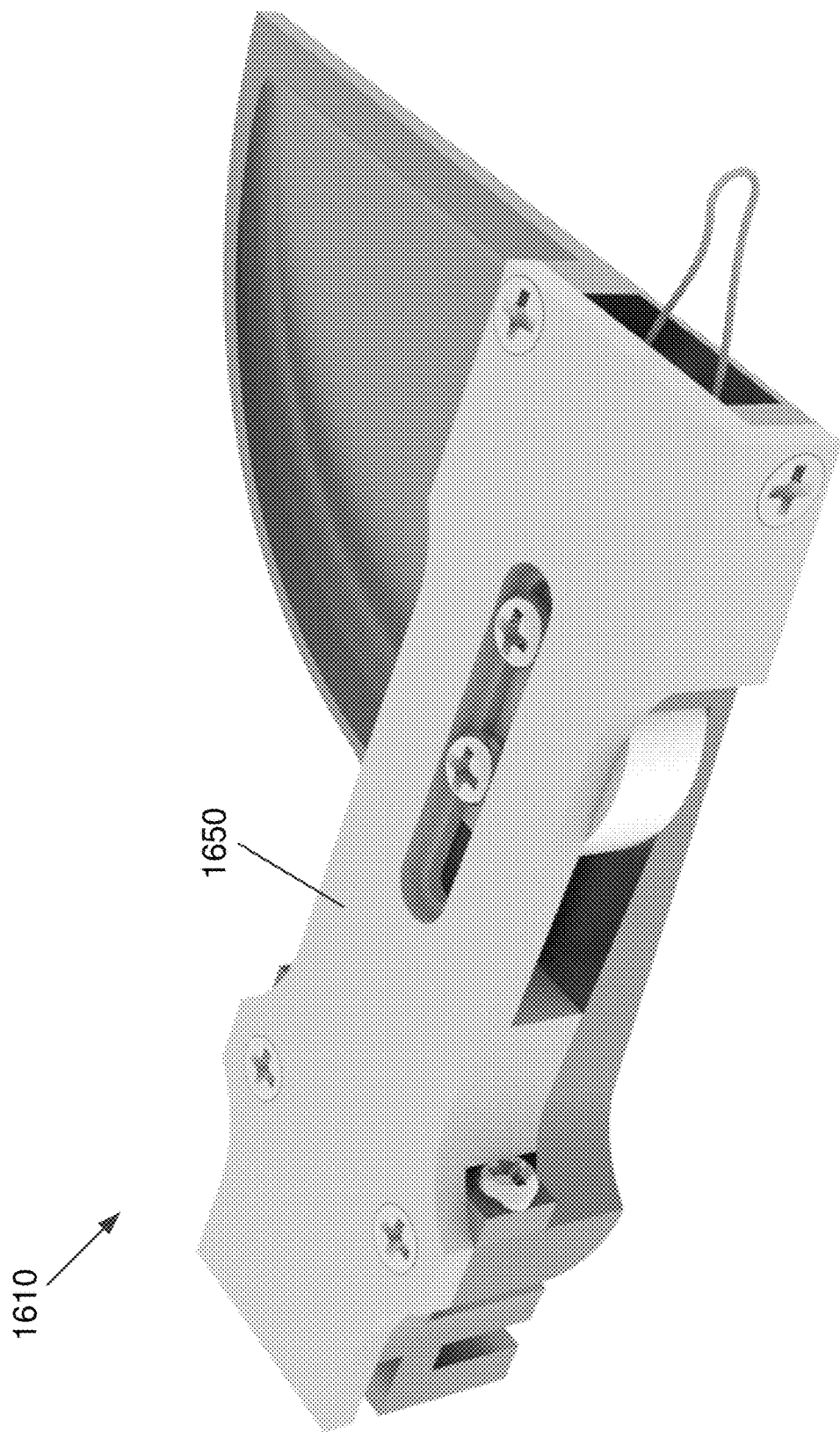
FIG. 16D is a perspective view illustrating the assembled cauterizing arm, according to an embodiment of the present invention.

FIG. 16B is a perspective view illustrating a bottom plate 1630 of cauterizing arm 1610, according to an embodiment of the present invention. Bottom plate 1630 includes a recess 1632. FIG. 16C is a perspective view illustrating a cauterizer 1640 of cauterizing arm 1610, according to an embodiment of the present invention. Cauterizer 1640 includes a replaceable cauterizer tip assembly 1642 including an insulator to insulate cauterizer tip assembly 1642 from the heat generated by cauterizer tip 1644. Cauterizer tip assembly 1642 is placed within recess 1632 and plugs into a connector 1646. Electrical current is supplied by the main space vehicle via connector 1646 to heat cauterizer tip 1644. FIG. 16D is a perspective view illustrating assembled cauterizing arm 1610, according to an embodiment of the present invention. A top panel 1650 covers cauterizer tip assembly 1642.

Figure 17:
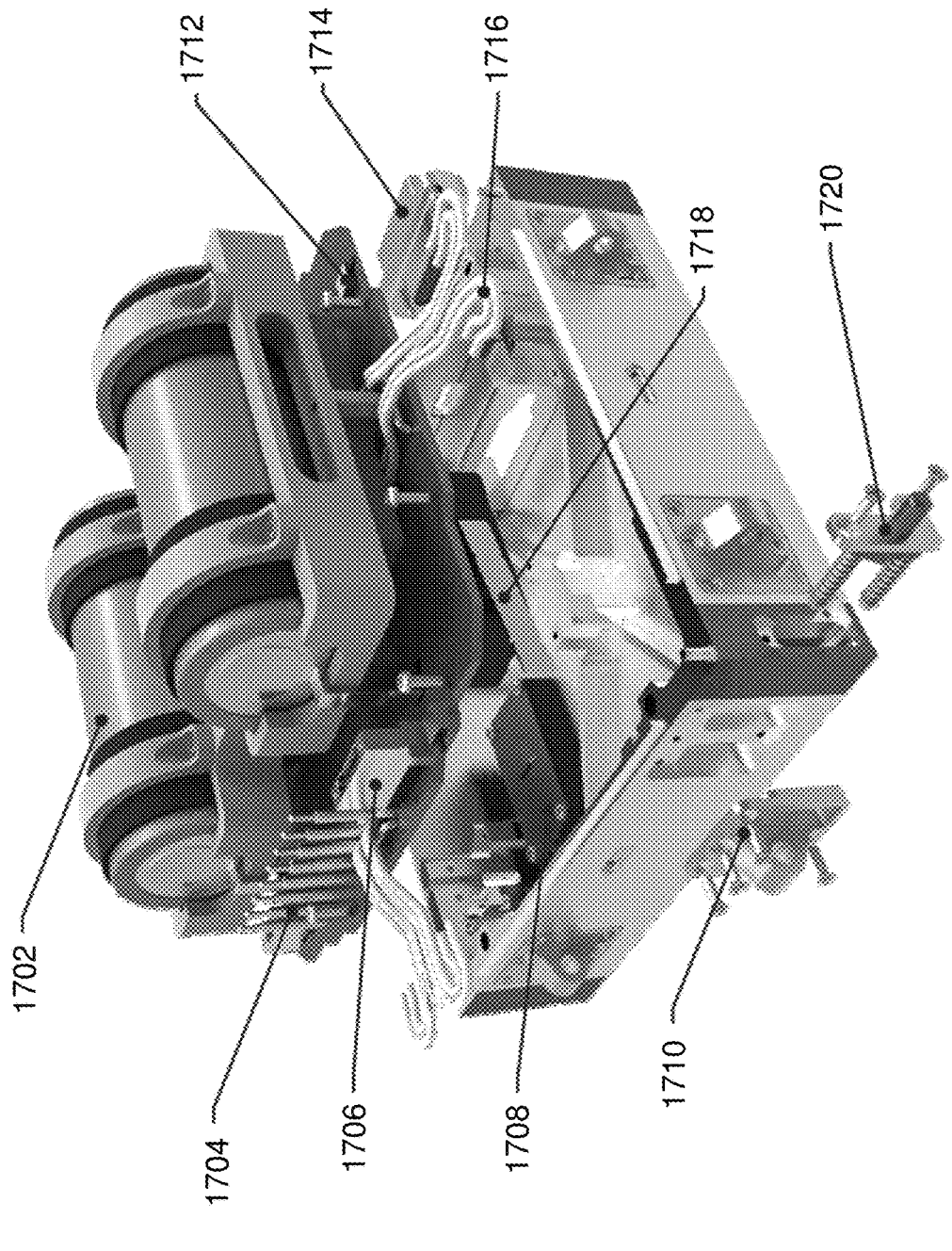
FIG. 17 is an exploded perspective view illustrating a power module, according to an embodiment of the present invention.

FIG. 17 is an exploded perspective view illustrating a power module 1700, according to an embodiment of the present invention. A pair of batteries provide primary power storage for the space vehicle. A power rail 1704 provides connections from batteries 1702 to the backplane (not shown). Backplane power sense and digital control lines 1706 provide the main space vehicle with access to temperature, voltage, and current sensors located on the power board and switches for sensing solar panel deployment.

A −Z sun angle sensor 1708 provides information about the position of the sun relative to the space vehicle. Solar panel hinges 1710 connect with hinges of a solar panel via a rod (not shown). Solar panel deployment detection switches 1712 detect whether the solar panels (not shown) are in a deployed state. Whereas most cubesats use a remove-before-flight pin, in this embodiment, a safe/arm connector 1714 is used to disconnect the battery from the main satellite electronics, ensuring the satellite is powered down while stored on the dispenser or while sitting in storage. The safe/arm switch also provides power, communications, and diagnostics for the space vehicle, allowing the space vehicle to be programmed, configured, and tested while in the fully assembled flight configuration, and also facilitates battery charging.

Solar panel cabling 1716 provides a path for the flow of electricity from the solar panels to batteries 1702. Separation power switches 1718 are switched on when the space vehicle is released from a dispenser or other vehicle or container. Rail separation switch plungers 1720 engage separation power switches 1718 when the space vehicle is loaded into the dispenser due to being in contact with rails inside the dispenser, and are released when the space vehicle is released.

FIG. 18 is a perspective view illustrating a battery assembly 1800, according to an embodiment of the present invention. A housing 1810 secures batteries 1820 in place within a power module of a space vehicle, fabricated using an additive machining process. A pair of high current welded tabs 1830 connect batteries 1820 to a power board, such as power board 1900 of FIGS. 19A and 19B.

FIG. 19A is a perspective view illustrating the top of power board 1900, according to an embodiment of the present invention. Power board 1900 provides maximum power point tracking with temperature for the solar panels of the space vehicle, charges the batteries, and provides power to the backplane. In some embodiments, power board 1900 includes a 5V rail, a 3.3V rail, a 1.5V rail, and a high current direct connection to the batteries. A safe arm connector 1910 is mounted directly to power board 1900, as shown in more detail in FIGS. 20A and 20A. A power sense and digital interface 1920 is used to connect the space vehicle command and data handling (C&DH) processor to the power board to access sensors and switches placed on the power board. High current power rail connections 1930 provide power to the main space vehicle assembly. A −Z sun sensor feedthrough 1940 provides power to the sun sensor.

Figure 19B:
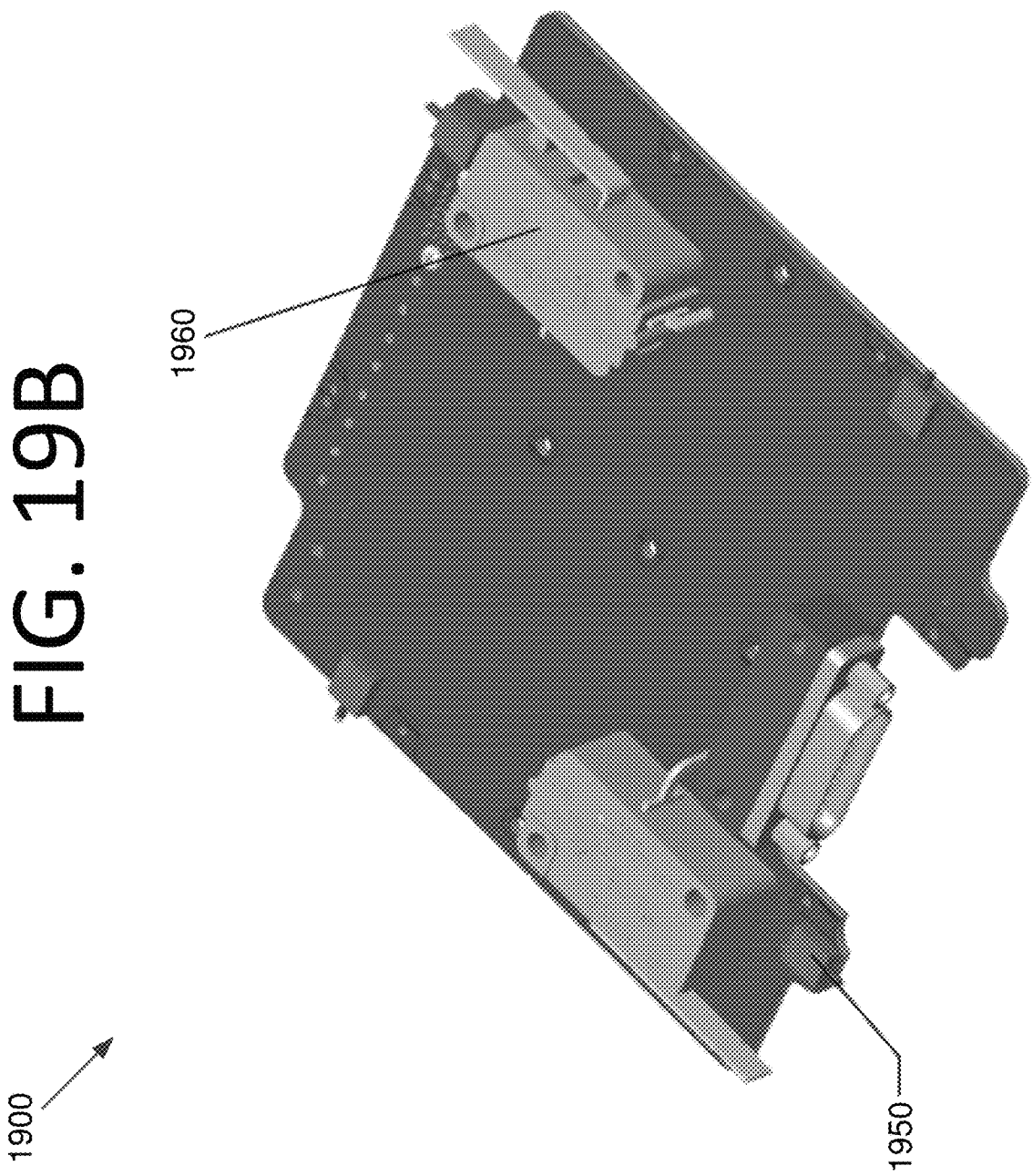
FIG. 19B is a perspective view illustrating the bottom of the power board, according to an embodiment of the present invention.

FIG. 19B is a perspective view illustrating the bottom of power board 1900, according to an embodiment of the present invention. Solar panel deployed indicator switches 1950 are activated for each solar panel when the respective solar panel deploys. A separation switch 1960 indicates that the space vehicle has been released from its dispenser or other deployment vehicle and connects/disconnects the batteries with the main power system. Two or more switches may be used in some embodiments to provide redundancy.

Figure 20A:
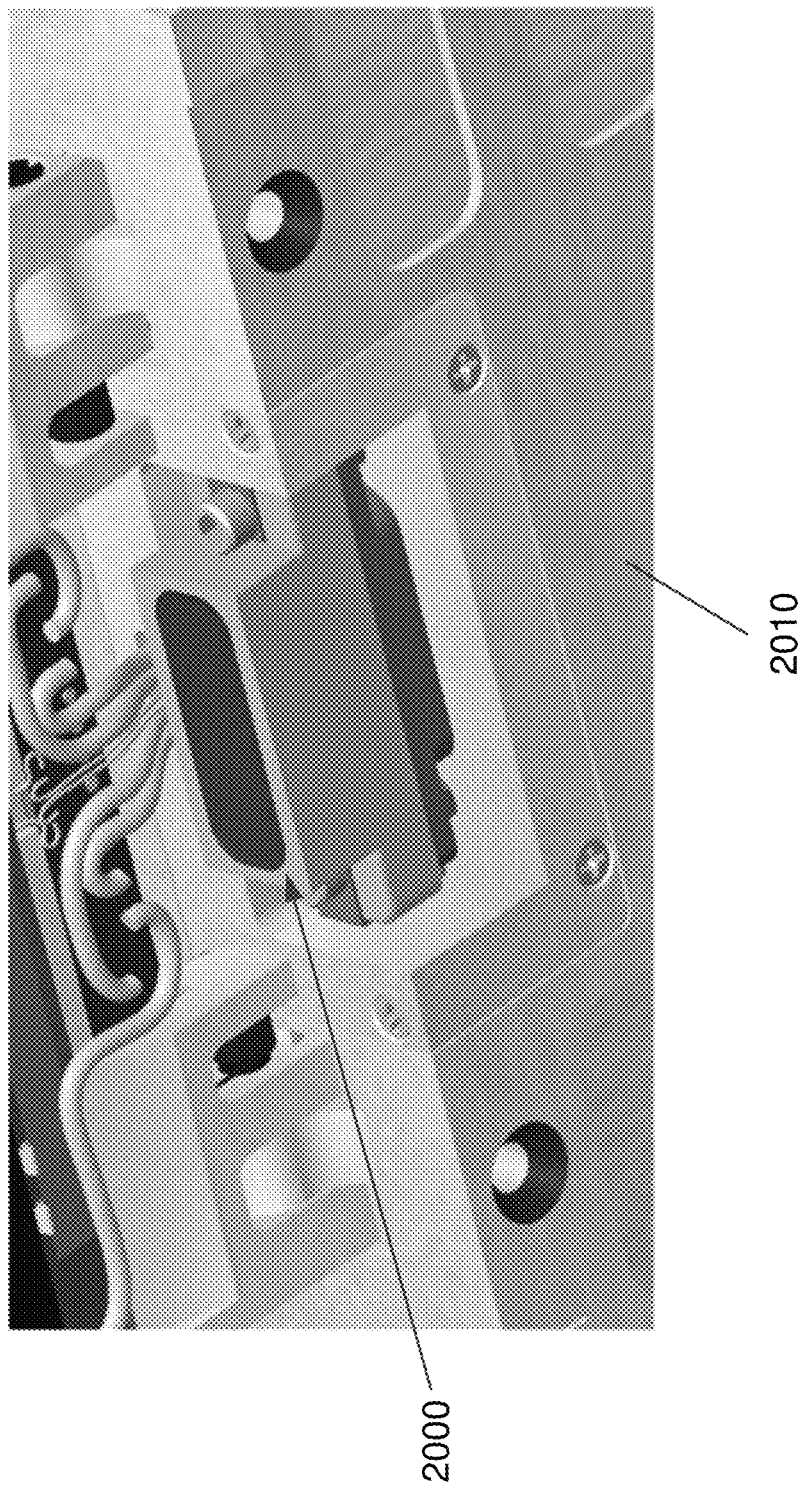
FIG. 20A is a perspective view illustrating a safe arm connector with a power module casing in place, according to an embodiment of the present invention.
Figure 20B:
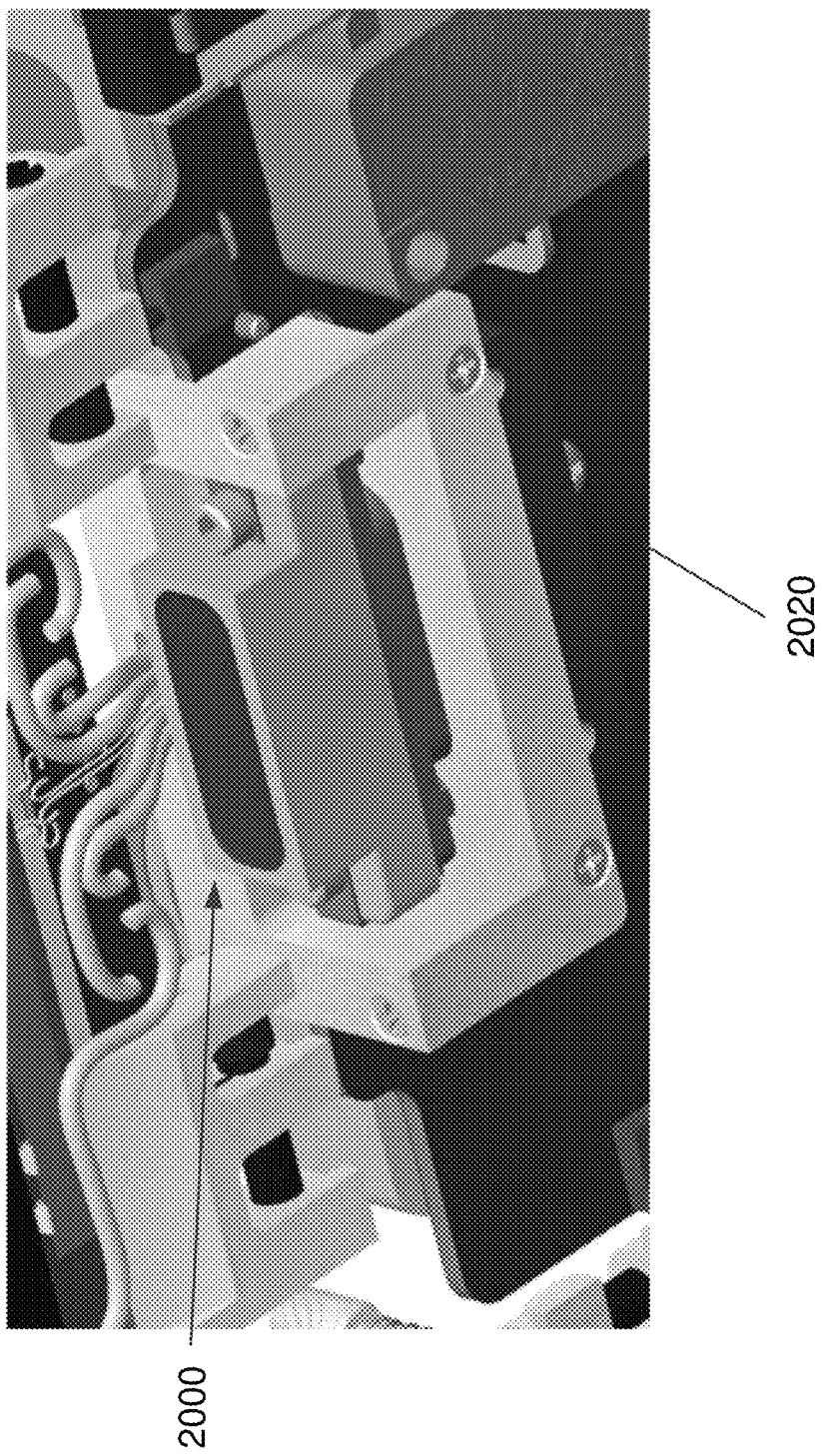
FIG. 20B is a perspective view illustrating the safe arm connector without the power module casing in place, according to an embodiment of the present invention.

FIGS. 20A and 20B are perspective views illustrating a safe arm connector 2000 with and without a power module casing 2010 in place, respectively, according to an embodiment of the present invention. Safe arm connector 2000 mounts directly to a power board 2020 and provides access to universal asynchronous receiver/transmitter (UART) to C&DH, the battery charging port, and an external power supply port for 5V.

Figure 21A:
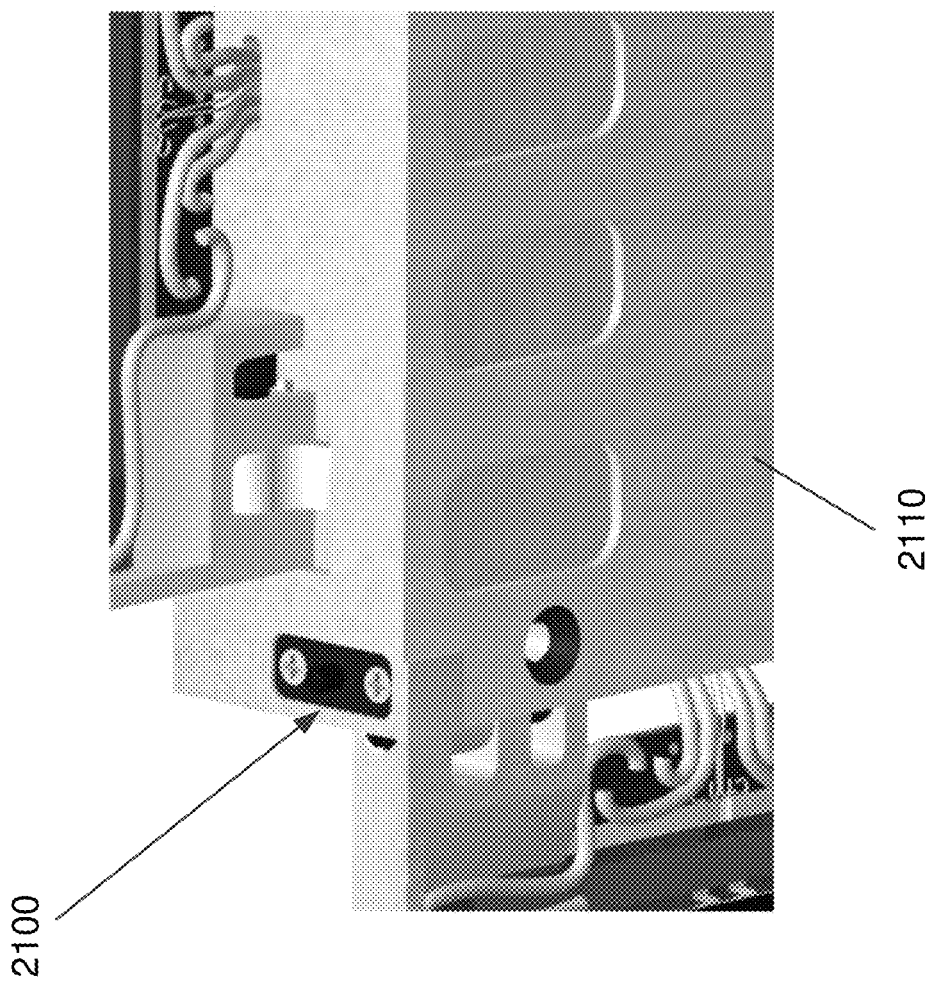
FIG. 21A is a perspective view illustrating a rail separation switch with a power module casing in place, according to an embodiment of the present invention.
Figure 21B:
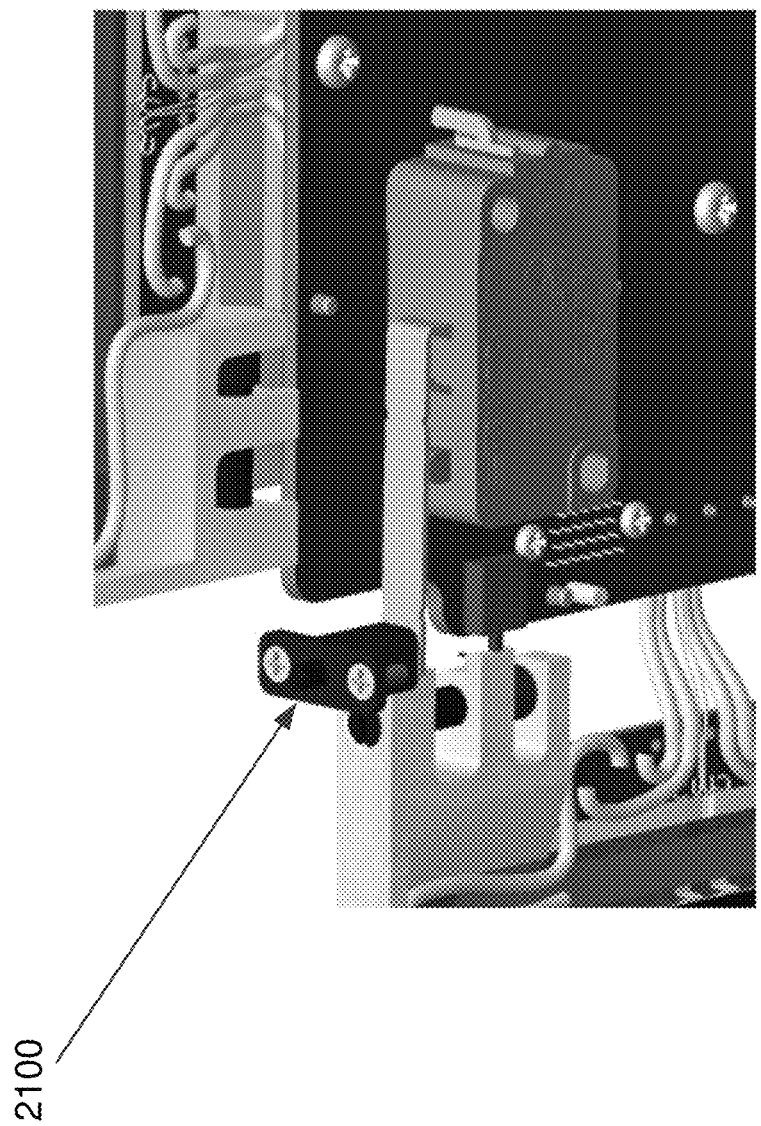
FIG. 21B is a perspective view illustrating the rail separation switch without the power module casing in place, according to an embodiment of the present invention.

FIGS. 21A and 21B are perspective views illustrating a rail separation switch 2100 with and without a power module casing 2110 in place, according to an embodiment of the present invention. In this embodiment, separation switch is a rail-based switch, ensuring that separation switch 2100 stays closed during vibration. When the space vehicle is deployed from a dispenser, for example, an internal rail of the dispenser is no longer in place, allowing separation switch 2100 to pop out. This may power on the space vehicle and start a timer (e.g., 30 minutes) for deployment of the solar panels and antenna.

FIG. 22 is a flowchart 2200 illustrating a process for deploying a space vehicle, according to an embodiment of the present invention. The process begins with releasing the space vehicle from a dispenser at 2210. Once released, a separator switch of the space vehicle is tripped and electronics power on at 2220. This may also start a timer for deployment of the antennas and solar panels.

The solar panels and antenna are then deployed at 2230. This may be accomplished by the same release mechanism or different release mechanisms. In some embodiments, a cauterizing wire may be heated and a nylon line may be cut. The space vehicle may then be oriented using wheels or any other desired orientation mechanism at 2240. The space vehicle then begins its mission at 2250.

In some embodiments, the solar panels have a multi-fold configuration where the panels fold outward from the space vehicle and then fold at least one more time, increasing the overall surface area of the solar panel array. An embodiment of a bi-fold solar panel and locking pin are discussed in more detail below with respect to FIGS. 23A, 23B, 24A, and 24B. The bi-fold panel doubles the solar cell area of the space vehicle solar panel in this embodiment, doubling the amount of power that is generated. However, one panel may be smaller than the other in some embodiments. Furthermore, in certain embodiments, the solar panels may fold out two times, three times, etc., and have three solar panels, four solar panels, etc. Any potential number of solar panels, panel shapes, and folds is encompassed within embodiments of the present invention. The number of solar panels and folds may be implemented based on power requirements, size requirements, cost, and complexity tolerance.

In some embodiments, solar cells are recessed into the solar panels. The solar panels may be aluminum, for instance. This may enable each solar panel pair in bi-fold embodiments fit within a cubesat dispenser when stowed where the space vehicle is a cubesat. Each solar panel may contain a flex-circuit underneath the solar cells. This flex circuit may route power from the cells to the space vehicle, and also route power, digital signals, and RF signals between the space vehicle and electronics mounted on the solar panel in some embodiments, such as deployment "hot tips," GPS antennas, low noise amplifiers, magnetometers, etc. Using this scheme, the solar panels may be connected to the space vehicle via a simple connector, which greatly simplifies space vehicle fabrication and assembly while increasing reliability. The solar panels may also contain a deployment switch that indicates to the satellite that the panels deployed correctly. When stowed, the solar panels may form a rigid box structure, enabling the solar panels to be robust to mechanical shock and vibration while keeping the individual solar panels thin and light when deployed.

The solar panels may be spring deployed in some embodiments, and may be deployed in 1 g (i.e., Earth's gravity) to enable testing on the ground, such as in a thermal vacuum chamber. The solar panels may feature an innovative locking pin mechanism. This pin may perform several functions. First, the locking pin mechanism may lock the deployed solar panel in place, and not allow it to bounce back after being fully deployed. Second, the locking pin mechanism may hold the outer solar panel (i.e., the solar panel that folds out from the inner solar panel) in place during deployment, until the inner solar panel (i.e., the solar panel that is attached to the space vehicle) has fully deployed. Third, the locking pin mechanism may provide a release mechanism for the outer solar panel, deploying the outer solar panel at the appropriate time. Taken together, this design ensures that: (1) the solar panels and deployment mechanism are robust and not damaged due to random vibrations; (2) the solar panel deployment is smooth, and will not hang up against the space vehicle or other components during deployment; and (3) deployment is consistent and the solar panels are locked in place every time the solar panels are deployed.

Figure 23A:
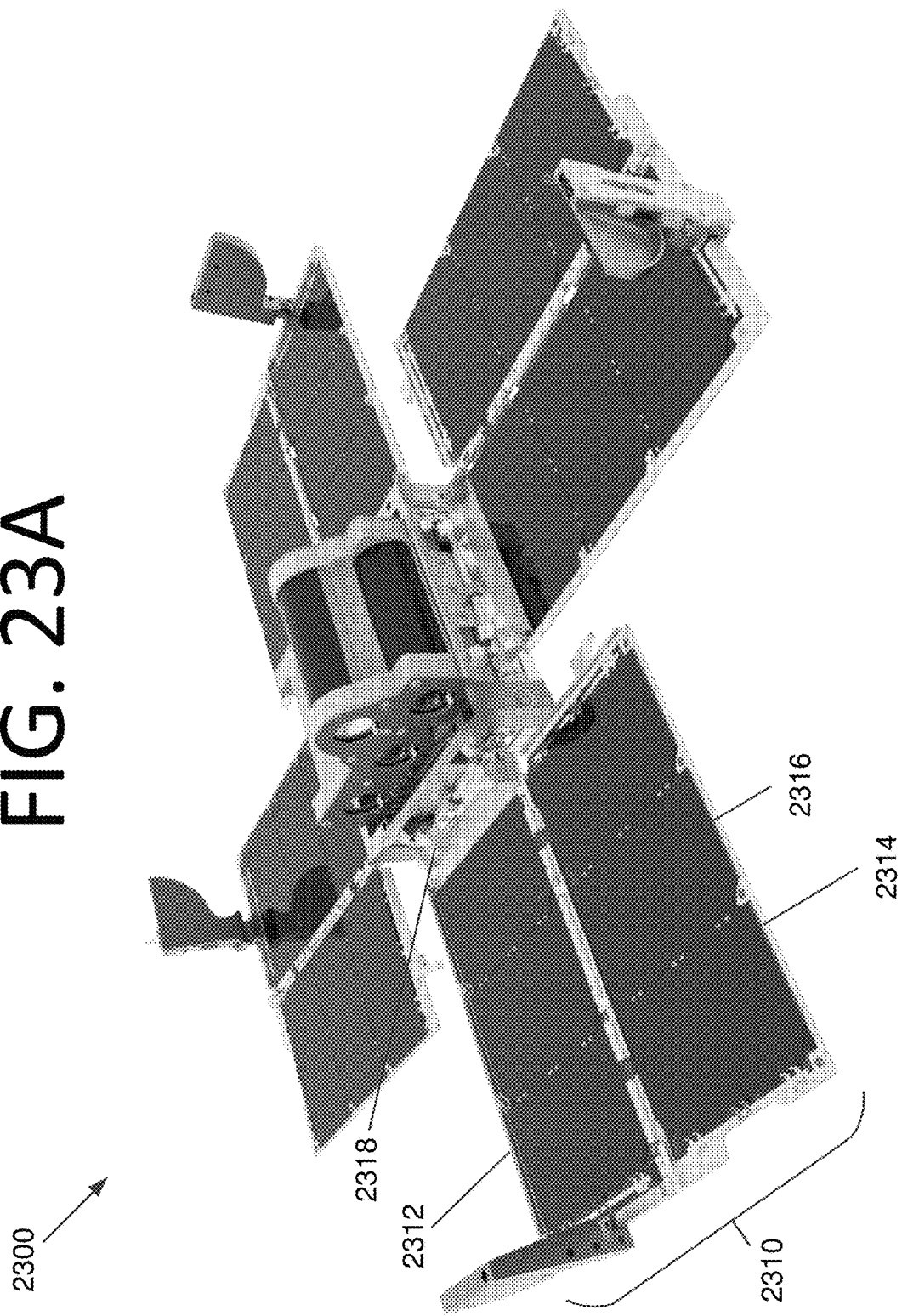
FIG. 23A is a perspective view illustrating a cubesat with a deployed multi-fold solar array, according to an embodiment of the present invention.

FIG. 23A is a perspective view illustrating a cubesat 2300 with a deployed multi-fold solar array having four bi-fold solar panels 2310, according to an embodiment of the present invention. In a stowed configuration, outer solar panels 2312 are folded against inner solar panels 2314, which are then folded against space vehicle 2300 via locking hinges 2318. Solar panels 2310 form a rigid box frame when stowed, providing ruggedness during random vibration. Solar cells 2316 are recessed to enable stowed solar panels 2310 to fit within a cubesat dispenser.

During deployment of solar panel 2310, inner solar panel 2312 first folds all the way down and locks in place via locking hinge 2318 before deploying outer solar panel 2314. In some embodiments, solar panel 2310 is deployable in 1 g, enabling testing on the ground. Each solar panel may contain a flex-circuit (not shown) that routes power, digital and analog signals, and RF to components at the end of solar panels 2310, such as the deployment mechanism "hot tips," a GPS antenna, and electronics including low noise amplifiers and a magnetometer. Finally, solar panels 2310 integrate a deploy switch (not shown) to indicate to space vehicle 2300 that solar panels 2310 deployed correctly.

Figure 23B:
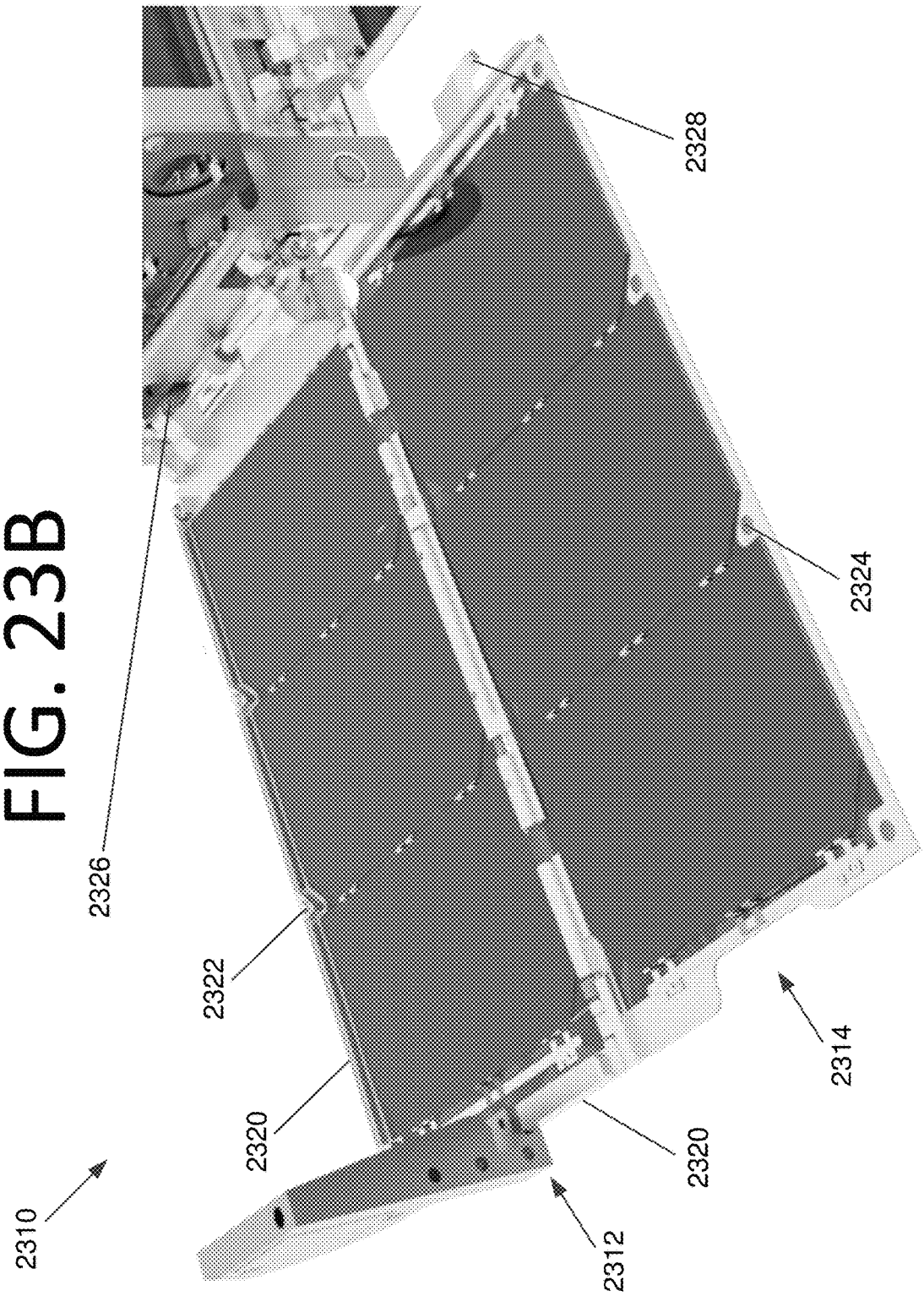
FIG. 23B is a closeup perspective view illustrating a bi-fold solar panel of the cubesat, according to an embodiment of the present invention.
Figure 24:
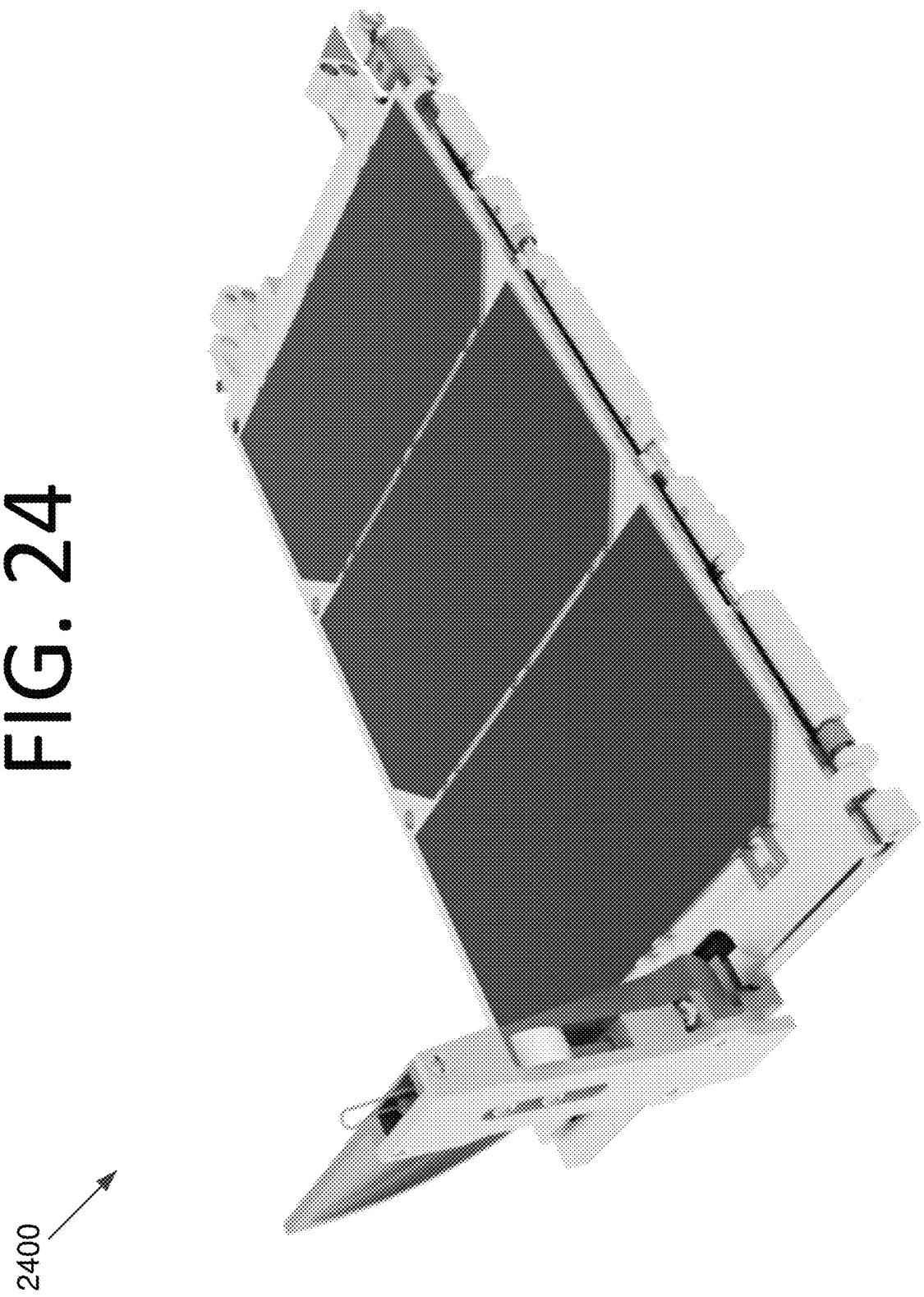
FIG. 24 is a perspective view illustrating a closed bi-fold solar panel, according to an embodiment of the present invention.
Figure 25:
FIG. 25 is a perspective view illustrating a cubesat with a closed bi-fold solar panel in a stowed configuration, according to an embodiment of the present invention.

FIG. 23B is a closeup perspective view illustrating bi-fold solar panel 2310 of cubesat 2300, according to an embodiment of the present invention. When stowed, the outer edge of solar panel 2310 rests against a raised boss 2320 on inner solar panel 2312, while tabs 2322 mate with tab indents 2324, forming a solid box structure. This allows the use of thinner panels made from material such as aluminum. Although the deployed panels would likely not survive random vibration, when stowed in this manner, the resulting box structure is very strong and robust. Also, when stowed, locking pin 2326 attaches to pin receptacle 2328. Locking pin 2326 may be spring loaded such that when the panel fully deploys, the pin retracts, freeing outer solar panel 2314 to deploy. This both locks solar panel 2310 in place and ensures that outer solar panel 2314 does not deploy until inner solar panel 2312 has fully deployed. Without this feature, outer solar panel 2314 may scrape or get hung up on the space vehicle surface or antenna elements during deployment, causing a deployment failure. FIG. 24 is a perspective view illustrating a closed bi-fold solar panel 2400, according to an embodiment of the present invention. FIG. 25 is a perspective view illustrating a cubesat 2500 with a closed bi-fold solar panel 2510 in a stowed configuration, according to an embodiment of the present invention.

Figure 26A:
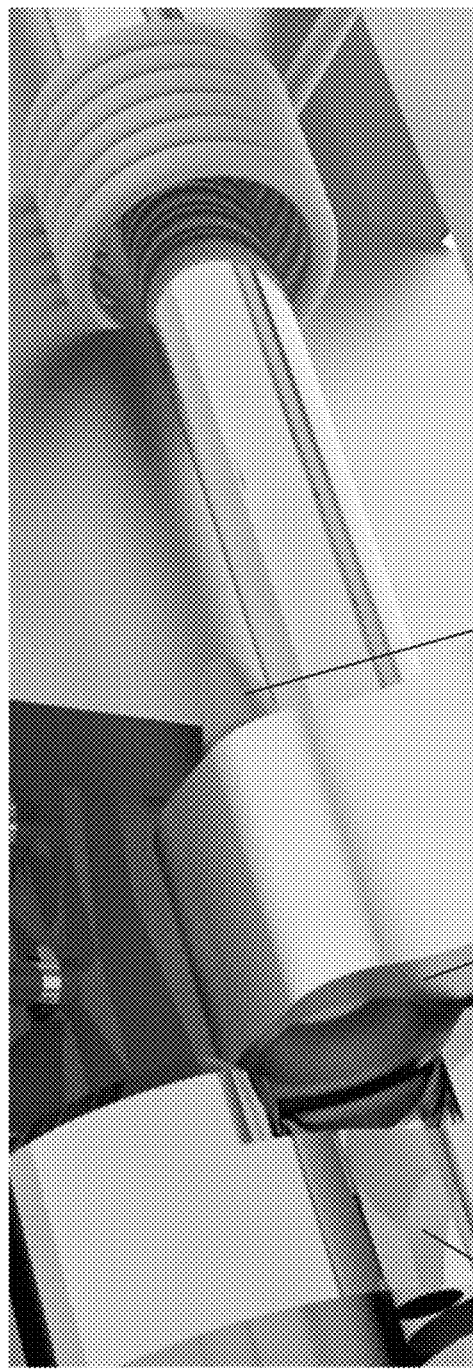
FIG. 26A is a perspective view illustrating a locking pin mechanism with a locking pin in a retracted (stowed) position, according to an embodiment of the present invention.
Figure 26B:
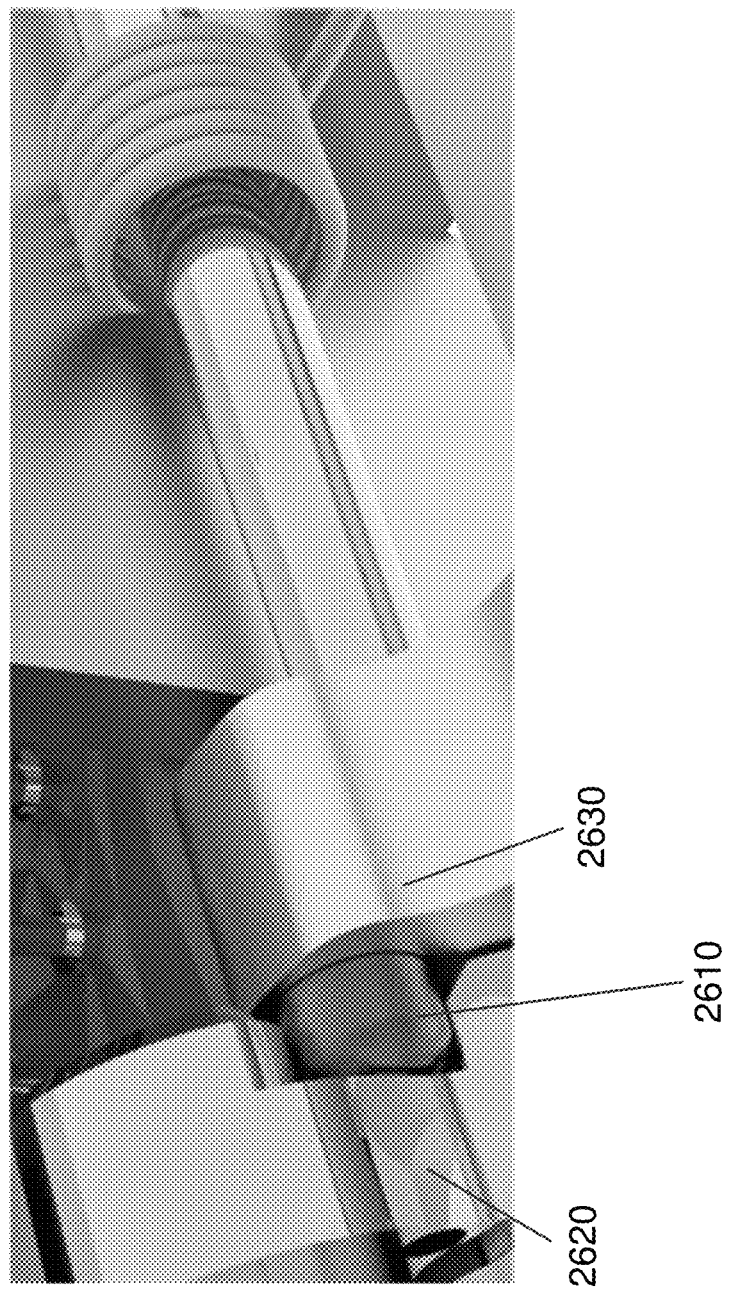
FIG. 26B is a perspective view illustrating the locking pin mechanism with the locking pin in an extended (deployed) position, according to an embodiment of the present invention.

FIGS. 26A and 26B are perspective views illustrating a locking pin mechanism 2600 including a locking pin 2610 in a retracted (stowed) position and an extended (deployed) position, respectively, according to an embodiment of the present invention. When stowed, locking pin 2610 holds the outer solar panel in place, and rests against the wall of a pin lock 2620. Locking pin 2610 is spring loaded in this embodiment via a spring (not shown). When the inner solar panel is fully deployed, locking pin 2610 moves into a recessed hole 2630, locking the inner solar panel in place and releasing the outer solar panel.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
a constrained, deployable helical antenna; and
a constrained, deployable dipole antenna attached to one end of the helical antenna, wherein
upon deployment, the helical antenna uncoils and the dipole antenna opens.

2. The apparatus of claim 1, further comprising:
a ground plane, wherein
the helical antenna is attached to another end of the ground plane.

3. The apparatus of claim 2, wherein the ground plane is deployable and comprises a plurality of flappers configured to unfold when the ground plane deploys.

4. The apparatus of claim 1, further comprising:
a plurality of constrained solar panels; and
a separation switch on a rail, wherein
the helical antenna and solar panels are deployed after the separation switch is triggered.

5. The apparatus of claim 1, further comprising:
a cable that connects the helical antenna to a body of the apparatus, wherein
the cable is stowed before the helical antenna is deployed and uncoiled when the helical antenna deploys.

6. The apparatus of claim 5, further comprising:
a coiling and uncoiling cup configured to stow the cable when the helical antenna is stowed.

7. The apparatus of claim 1, wherein the helical antenna comprises a helical spring and a plurality of cords connected to the helical spring, the plurality of cords configured to hold the helical spring sufficiently rigid to operate as a high gain antenna, and to prevent the helical antenna from detaching from the apparatus during deployment.

8. The apparatus of claim 7, wherein the plurality of cords are connected to a support member by respective anchors.

9. The apparatus of claim 1, further comprising:
a power module comprising a plurality of solar panels, a power board that interfaces with the plurality of solar panels, and at least one battery, wherein
the power module is configured to be removed from other modules of the apparatus without disturbing components of the other modules.

10. The apparatus of claim 1, further comprising:
a plurality of solar panels; and
a release mechanism located on a plurality of tip plates that attach to respective solar panels of the plurality of solar panels, wherein
when released, the release mechanism is configured to allow the helical antenna, dipole antenna, and solar panels to deploy using a single release point.

11. The apparatus of claim 10, wherein the release mechanism is configured to deploy the helical antenna, the dipole antenna, and the plurality of solar panels and be reset.

12. The apparatus of claim 10, wherein the release mechanism comprises a pair of cauterizing arms and a pair of holding arms.

13. The apparatus of claim 1, further comprising:
a plurality of multi-fold solar panels, wherein
the plurality of multi-fold solar panels are configured to unfold at least two times, further increasing a collective surface area of the plurality of solar panels.

14. The apparatus of claim 13, further comprising:
an inner solar panel;
an outer solar panel operably connected to the inner solar panel; and
a locking pin configured to hold the inner solar panel and the outer solar panel in place when in a stowed configuration, and configured to lock the inner solar panel in place when fully deployed, releasing the outer solar panel.

* * * * *